(12) United States Patent
Wang

(10) Patent No.: US 12,120,322 B2
(45) Date of Patent: *Oct. 15, 2024

(54) LEVEL INFORMATION FOR SUB-PICTURE TRACKS

(71) Applicant: Lemon Inc., Grand Cayman (KY)

(72) Inventor: Ye-kui Wang, San Diego, CA (US)

(73) Assignee: Lemon Inc.

( * ) Notice: Subject to any disclaimer, the term of this patent is extended or adjusted under 35 U.S.C. 154(b) by 0 days.

This patent is subject to a terminal disclaimer.

(21) Appl. No.: 17/719,169

(22) Filed: Apr. 12, 2022

(65) Prior Publication Data

US 2022/0345722 A1 Oct. 27, 2022

Related U.S. Application Data

(60) Provisional application No. 63/175,421, filed on Apr. 15, 2021.

(51) Int. Cl.
| | | |
|---|---|---|
| *H04N 19/177* | (2014.01) | |
| *H04N 19/124* | (2014.01) | |
| *H04N 19/132* | (2014.01) | |
| *H04N 19/172* | (2014.01) | |
| *H04N 19/46* | (2014.01) | |
| *H04N 19/96* | (2014.01) | |

(52) U.S. Cl.
CPC ......... *H04N 19/177* (2014.11); *H04N 19/124* (2014.11); *H04N 19/132* (2014.11); *H04N 19/172* (2014.11); *H04N 19/46* (2014.11); *H04N 19/96* (2014.11)

(58) Field of Classification Search
CPC .......................... H04N 19/177; H04N 19/124
See application file for complete search history.

(56) References Cited

U.S. PATENT DOCUMENTS

| | | | |
|---|---|---|---|
| 2022/0217389 | A1 | 7/2022 | Sychev |
| 2022/0345722 | A1 | 10/2022 | Wang |
| 2022/0345725 | A1 | 10/2022 | Wang |
| 2023/0027058 | A1 | 1/2023 | Hannuksela et al. |

FOREIGN PATENT DOCUMENTS

| | | |
|---|---|---|
| EP | 4080884 A1 | 10/2022 |
| EP | 4080887 A1 | 10/2022 |
| ES | 2739225 T3 | 1/2020 |
| JP | 2023508736 A | 3/2023 |

(Continued)

OTHER PUBLICATIONS

"Information technology—Coding of audio-visual objects—Part 15: Carriage of network abstraction layer (NAL) unit structured video in the ISO base media file format," ISO/IEC 14496-15: 2021 (E) Draft FDIS stage, 2021, 282 pages. (Year: 2021).*

(Continued)

*Primary Examiner* — Jerry T Jean Baptiste
(74) *Attorney, Agent, or Firm* — Conley Rose, P.C.

(57) ABSTRACT

A mechanism for processing video data is disclosed. A level indicator for a set of subpictures in one or more subpicture tracks is determined. The level indicator is included in a sample group carrying information for the set of subpictures. A conversion is performed between a visual media data and a media data file based on the level indicator.

19 Claims, 9 Drawing Sheets

700

702 — Determine a level indicator for a set of subpictures in one or more subpicture tracks, wherein the level indicator is included in a sample group carrying information for the set of subpictures.

704 — Perform a conversion between a visual media data and a media data file based on the level indicator.

(56) References Cited

FOREIGN PATENT DOCUMENTS

| WO | 2019072795 A1 | 4/2019 |
|---|---|---|
| WO | 2020146582 A1 | 7/2020 |

OTHER PUBLICATIONS

Summary of voting on ISO/IEC 14496-15: 2019/Damd 2 (Ed 5), Dec. 29, 2020, 63 pages. (Year: 2020).*
Summary of voting on ISO /IEC 14496-15: 2019/Damd 2 (Ed 5), Dec. 29, 2020, 63 pages.
Non-Final Office Action dated Mar. 14, 2023, U.S. Appl. No. 17/719,173, filed Apr. 12, 2022.
"Information technology—Coding of audio-visual objects—Part 15: Carriage of network abstraction layer (NAL) unit structured video in the ISO base media file format," ISO/IEC 14496-15: 2021 (E) Draft FDIS stage, 2021, 282 pages.
Wang, Y-K., "Level signalling for sets of subpicture tracks in a subpicture entity group," ISO/IEC JTC 1/SC 29/WG 3m56676, Apr. 2021, 5 pages.
Nokia, "VVC Subpictures in ISO/IEC 14496-15," ISO/IEC JTC1/SC29/WG11 MPEG2020/M52209, Jan. 2020, 5 pages.
Foreign Communication From A Related Counterpart Application, European Application No. 22168610.8, Extended European Search Report dated Sep. 28, 2022, 10 pages.
Foreign Communication From A Related Counterpart Application, European Application No. 22168612.4, Extended European Search Report dated Sep. 28, 2022, 9 pages.
Foreign Communication From A Related Counterpart Application, Indian Application No. 20222402276, Indian Office Action dated Nov. 23, 2022, 7 pages.
Information technology—High Efficiency coding and media delivery in heterogeneous environments—Part 2: High Efficiency Video Coding, ISO/IEC JTC 1/SC/WG 11, N17661, Rec. ITU-T H.265 | ISO/IEC 23008-2, Apr. 20, 2018, 8 pages.
Document: JVET-G1001, Chen, J., et al., "Algorithm description of Joint Exploration Test Model 7 (JEM7)," Joint Video Exploration Team (JVET) of ITU-T DG WP 3 and ISO/IEC JTC1/SC 29/WG 11, 7th Meeting: Torino, IT, Jul. 13-21, 2017, 48 pages.
"Information technology—Coded representation of immersive media—Part 3: Versatile video coding," ISO/IEC JTC 1/SC 29 /WG 11 N 18692 Text of ISO/IEC CD 23090-3 Rec. ITU-T H.266, Jul. 12, 2019, 445 pages.
Document: JVET-S2001vH, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 548 pages.
Series H: Audiovisual and Multimedia Systems Infrastructure of audiovisual services—Coding of moving video; Versatile supplemental enhancement information messages for coded video bitstreams, Recomendation ITU-T H.274, ISO/IEC 23002-7, Aug. 2020, 86 pages.
Document: JVET-S2007, Boyce, J., et al., "Supplemental enhancement information for coded video bitstreams (Draft 5)," Joint Video Experts Team (JVET) of ITU-T SG 16 WP 3 and ISO/IEC JTC 1/SC 29/WG 11 18th Meeting: by teleconference, Apr. 15-24, 2020, 83 pages.
Qualcomm Incorporated "Editor's Version of DASH IS 4th Edition," ISO/IEC JTC1/SC29/WG11 MPEG2019/m52458, Brussels, BE, Jan. 2020, 287 pages.
"Information technology—Coding of audio-visual objects—Part 15: Carriage of network abstraction layer (NAL) unit structured video in the ISO base media file format," ISO/IEC JTC 1/SC 29/WG 03, ISO/IEC 14496-15:2021(E), Feb. 26, 2021, 284 pages.
"Information technology—High efficiency coding and media delivery in heterogeneous environments—Part 12: Image File Format—Amendment 2: Support for VVC, EVC, slideshows and other improvements," ISO/IEC 23008-12:2017/DAM 2:2021(E) ISO/IEC JTC1/SC, Jan. 29, 2021, 39 pages.
"Text of ISO/IEC FDIS 23000-19 2nd edition Common Media Application Format" ISO/IEC JTC 1/SC 29/WG 11, N18636, Aug. 13, 2019, 146 pages.
"Text of ISO/IEC 23000-19:2019 CDAM 2 CMAF Media Profiles for MPEG-H 3D Audio, EVC, VVC and other technologies", ISO/IEC JTC 1/SC 29/WG 03 N0137, Jan. 15, 2021, 25 pages.
Final Office Action from U.S. Appl. No. 17/719,173 dated Sep. 18, 2023, 25 pages.
"Information technology—Coding of audio-visual objects—Part 15: Carriage of network abstraction layer (NAL) unit structured video in the ISO base media file format Amendment 2: Carriage of VVC in ISOBMFF," ISO/IEC 14496-15:2019/DAM 2:2020(E), ISO/IEC, Oct. 5, 2020, 15 pages.
Non-Final Office Action from U.S. Patent Application No. 17/719,187 dated Dec. 27, 2023.

* cited by examiner

CTU   Tile   Subpicture / Slice

LEVEL INFORMATION FOR SUB-PICTURE TRACKS

CROSS-REFERENCE TO RELATED APPLICATIONS

This patent application claims the benefit of U.S. Provisional Patent Application No. 63/175,421 filed Apr. 15, 2021 by Ye-Kui Wang, and titled "Signalling Of Information For Sets Of Subpicture Tracks," which is hereby incorporated by reference.

TECHNICAL FIELD

This patent document relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: determining a level indicator for a set of subpictures in one or more subpicture tracks, wherein the level indicator is included in a sample group carrying information for the set of subpictures; and performing a conversion between a visual media data and a media data file based on the level indicator.

Optionally, in any of the preceding aspects, another implementation of the aspect provides that a name of the sample group indicates the level indicator.

Optionally, in any of the preceding aspects, another implementation of the aspect provides that the sample group is a subpicture level information sample group.

Optionally, in any of the preceding aspects, another implementation of the aspect provides that the level indicator is contained in a sample entry of the sample group.

Optionally, in any of the preceding aspects, another implementation of the aspect provides that the subpicture tracks are included in a subpicture entity group.

Optionally, in any of the preceding aspects, another implementation of the aspect provides that a sample entry of the sample group contains an indication of a grouping type of the subpicture entity group.

Optionally, in any of the preceding aspects, another implementation of the aspect provides that a grouping type parameter (grouping_type_parameter) of the sample group contains an indication of a grouping type of the subpicture entity group.

Optionally, in any of the preceding aspects, another implementation of the aspect provides that a rule requires all sample to group boxes (SampleToGroupBoxes) for subpictures to contain a grouping type parameter (grouping_type_parameter) indicating a grouping type of the subpicture entity group.

Optionally, in any of the preceding aspects, another implementation of the aspect provides that one bit of the grouping_type_parameter is a subpicture common group flag (subpic_common_group_flag) that indicates the grouping type of the subpicture entity group.

Optionally, in any of the preceding aspects, another implementation of the aspect provides that a group identifier of an entity to group box (EntityToGroupBox) associated with the subpicture entity group is contained in a sample entry of the sample group.

A second aspect relates to apparatus for processing video data comprising: a processor; and a non-transitory memory with instructions thereon, wherein the instructions upon execution by the processor, cause the processor to: determine a level indicator for a set of subpictures in one or more subpicture tracks, wherein the level indicator is included in a sample group carrying information for the set of subpictures; and perform a conversion between a visual media data and a media data file based on the level indicator.

Optionally, in any of the preceding aspects, another implementation of the aspect provides that a name of the sample group indicates the level indicator.

Optionally, in any of the preceding aspects, another implementation of the aspect provides that the sample group is a subpicture level information sample group.

Optionally, in any of the preceding aspects, another implementation of the aspect provides that wherein the level indicator is contained in a sample entry of the sample group.

Optionally, in any of the preceding aspects, another implementation of the aspect provides that the subpicture tracks are included in a subpicture entity group.

A third aspect relates to a non-transitory computer readable medium comprising a computer program product for use by a video coding device, the computer program product comprising computer executable instructions stored on the non-transitory computer readable medium such that when executed by a processor cause the video coding device to: determine a level indicator for a set of subpictures in one or more subpicture tracks, wherein the level indicator is included in a sample group carrying information for the set of subpictures; and perform a conversion between a visual media data and a media data file based on the level indicator.

Optionally, in any of the preceding aspects, another implementation of the aspect provides that a name of the sample group indicates the level indicator.

Optionally, in any of the preceding aspects, another implementation of the aspect provides that the sample group is a subpicture level information sample group.

Optionally, in any of the preceding aspects, another implementation of the aspect provides that wherein the level indicator is contained in a sample entry of the sample group.

Optionally, in any of the preceding aspects, another implementation of the aspect provides that the subpicture tracks are included in a subpicture entity group.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
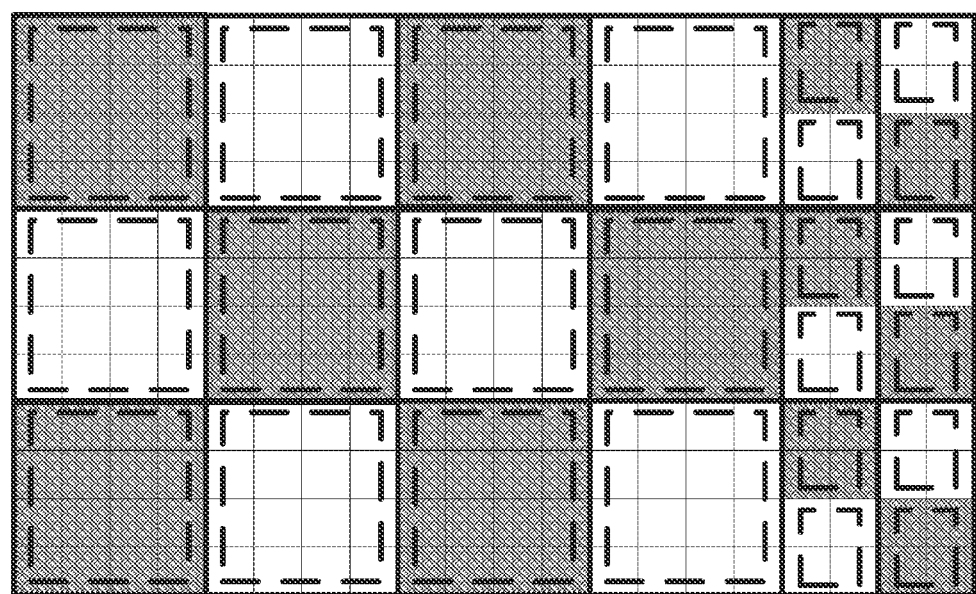
FIG. 1 is a schematic diagram of an example picture partitioned into slices, sub-pictures, tiles, and coding tree units (CTUs).
Figure 1:
Figure 1:
Figure 1:

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

This patent document is related to a video file format. Specifically, this document is related to signaling of information for certain sets of subpicture tracks in a subpicture entity group. This supports carriage of subpictures of a Versatile Video Coding (VVC) video bitstream in multiple tracks in a media file based on the International Organization for Standardization (ISO) base media file format (ISOBMFF). The ideas described herein may be applied individually or in various combinations, for video bitstreams coded by any codec, such as the VVC standard, and for any video file format, such as the VVC video file format.

The present disclosure includes the following abbreviations. Adaptive color transform (ACT), adaptive loop filter (ALF), adaptive motion vector resolution (AMVR), adaptation parameter set (APS), access unit (AU), access unit delimiter (AUD), advanced video coding (Rec. ITU-T H.264|ISO/IEC 14496-10) (AVC), bi-predictive (B), bi-prediction with coding unit (CU)-level weights (BCW), bi-directional optical flow (BDOF), block-based delta pulse code modulation (BDPCM), buffering period (BP), context-based adaptive binary arithmetic coding (CABAC), coding block (CB), constant bit rate (CBR), cross-component adaptive loop filter (CCALF), coded picture buffer (CPB), clean random access (CRA), cyclic redundancy check (CRC), coding tree block (CTB), coding tree unit (CTU), coding unit (CU), coded video sequence (CVS), decoding capability information (DCI), decoding initialization information (DII), decoded picture buffer (DPB), dependent random access point (DRAP), decoding unit (DU), decoding unit information (DUI), exponential-Golomb (EG), k-th order exponential-Golomb (EGk), end of bitstream (EOB), end of sequence (EOS), filler data (FD), first-in, first-out (FIFO), fixed-length (FL), green, blue, and red (GBR), general constraints information (GCI), gradual decoding refresh (GDR), geometric partitioning mode (GPM), high efficiency video coding, also known as Rec. ITU-T H.265|ISO/IEC 23008-2, (HEVC), hypothetical reference decoder (HRD), hypothetical stream scheduler (HSS), intra (I), intra block copy (IBC), instantaneous decoding refresh (IDR), inter layer reference picture (ILRP), intra random access point (IRAP), low frequency non-separable transform (LFNST), least probable symbol (LPS), least significant bit (LSB), long-term reference picture (LTRP), luma mapping with chroma scaling (LMCS), matrix-based intra prediction (MIP), most probable symbol (MPS), most significant bit (MSB), multiple transform selection (MTS), motion vector prediction (MVP), network abstraction layer (NAL), output layer set (OLS), operation point (OP), operating point information (OPI), predictive (P), picture header (PH), picture order count (POC), picture parameter set (PPS), prediction refinement with optical flow (PROF), picture timing (PT), picture unit (PU), quantization parameter (QP), random access decodable leading picture (RADL), random access skipped leading picture (RASL), raw byte sequence payload (RBSP), red, green, and blue (RGB), reference picture list (RPL), sample adaptive offset (SAO), sample aspect ratio (SAR), supplemental enhancement information (SEI), slice header (SH), subpicture level information (SLI), string of data bits (SODB), sequence parameter set (SPS), short-term reference picture (STRP), step-wise temporal sublayer access (STSA), truncated rice (TR), variable bit rate (VBR), video coding layer (VCL), video parameter set (VPS), versatile supplemental enhancement information, also known as Rec. ITU-T H.274 ISO/IEC 23002-7, (VSEI), video usability information (VUI), and versatile video coding, also known as Rec. ITU-T H.266|ISO/IEC 23090-3, (VVC).

Video coding standards have evolved primarily through the development of the International Telecommunication Union (ITU) Telecommunications Standardization Sector (ITU-T) and ISO/International Electrotechnical Commission (IEC) standards. The ITU-T produced H.261 and H.263, ISO/IEC produced Motion Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the further video coding technologies beyond HEVC, the Joint Video Exploration Team (WET) was founded by Video Coding Experts Group (VCEG) and MPEG jointly. Many methods have been adopted by JVET and put into the reference software named Joint Exploration Model (JEM). The JVET was later renamed to be the Joint Video Experts Team (JVET) when the Versatile Video Coding (VVC) project officially started. VVC is a coding standard targeting a 50% bitrate reduction as compared to HEVC. VVC has been finalized by the JVET.

The VVC standard, also known as ITU-T H.266|ISO/IEC 23090-3, and the associated Versatile Supplemental Enhancement Information (VSEI) standard, also known as ITU-T H.274 ISO/IEC 23002-7, are designed for use in a broad range of applications, such as television broadcast, video conferencing, playback from storage media, adaptive bit rate streaming, video region extraction, composition and merging of content from multiple coded video bitstreams, multiview video, scalable layered coding, and viewport-adaptive three hundred sixty degree (360°) immersive media.

File format standards are discussed below. Media streaming applications are typically based on the Internet Protocol (IP), Transmission Control Protocol (TCP), and Hypertext Transfer Protocol (HTTP) transport methods, and typically rely on a file format such as the ISOBMFF. One such streaming system is dynamic adaptive streaming over HTTP (DASH). Video can be encoded in a video format, such as AVC and/or HEVC. The encoded video can be encapsulated in ISOBMFF tracks and included in DASH representations and segments. Important information about the video bitstreams, such as the profile, tier, and level, and many others, may be exposed as file format level metadata and/or in a DASH media presentation description (MPD) for content selection purposes. For example, such information can be used for selection of appropriate media segments both for initialization at the beginning of a streaming session and for stream adaptation during the streaming session.

Similarly, when using an image format with ISOBMFF, a file format specification specific to the image format, such as the AVC image file format and the HEVC image file format, may be employed. The VVC video file format, the file format for storage of VVC video content based on ISOBMFF, is under development by MPEG. The VVC image file format, the file format for storage of image content coded using VVC, based on ISOBMFF, is also under development by MPEG.

Picture partitioning schemes in HEVC are now discussed. HEVC includes four different picture partitioning schemes, namely regular slices, dependent slices, tiles, and Wavefront Parallel Processing (WPP). These partitioning schemes may be applied for Maximum Transfer Unit (MTU) size matching, parallel processing, and reduced end-to-end delay.

Regular slices are similar as in H.264/AVC. Each regular slice is encapsulated in its own NAL unit, and in-picture prediction (intra sample prediction, motion information prediction, coding mode prediction) and entropy coding dependency across slice boundaries are disabled. Thus, a regular slice can be reconstructed independently from other regular slices within the same picture (though there may still have interdependencies due to loop filtering operations).

The regular slice can be used for parallelization and is also available in H.264/AVC. Regular slice-based parallelization does not require significant inter-processor and/or inter-core communication. An exception is for inter-processor or inter-core data sharing for motion compensation when decoding a predictively coded picture. Such predictively coded picture is typically much heavier than inter-processor or inter-core data sharing due to in-picture prediction. However, for the same reason, the use of regular slices can incur substantial coding overhead due to the bit cost of the slice header and due to the lack of prediction across the slice boundaries. Further, regular slices, in contrast to the other tools mentioned below, also serve as a mechanism for bitstream partitioning to match MTU size requirements. This is due to the in-picture independence of regular slices and due to the fact that each regular slice is encapsulated in its own NAL unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at treeblock boundaries without breaking in-picture prediction. Dependent slices provide fragmentation of regular slices into multiple NAL units. This provides reduced end-to-end delay by allowing a part of a regular slice to be sent out before the encoding of the entire regular slice is finished.

In WPP, a picture is partitioned into single rows of coding tree blocks (CTBs). Entropy decoding and prediction are allowed to use data from CTBs in other partitions. Parallel processing is possible through parallel decoding of CTB rows. The start of the decoding of a CTB row is delayed by two CTBs to ensure that data related to a CTB above and a CTB to the right of the subject CTB is available before the subject CTB is being decoded. Using this staggered start, which appears like a wavefront when represented graphically, parallelization is possible with up to as many processors/cores as the picture contains CTB rows. Because in-picture prediction between neighboring treeblock rows within a picture is permitted, the inter-processor/inter-core communication used to enable in-picture prediction can be substantial. The WPP partitioning does not result in the production of additional NAL units. Thus, WPP is not a tool for MTU size matching. However, when MTU size matching is used, regular slices can be used with WPP with certain coding overhead.

Tiles define horizontal and vertical boundaries that partition a picture into tile columns and rows. Tile columns are configured from the top of a picture to the bottom of the picture. Likewise, tile rows are configured from the left of the picture to the right of the picture. The number of tiles in a picture can be derived as number of tile columns multiplied by number of tile rows.

The scan order of CTBs may be local within a tile. The scan order may be in the order of a CTB raster scan of a tile. Accordingly, all CTBs within a tile may be decoded before decoding the top-left CTB of the next tile in the order of tile raster scan of a picture. Similar to regular slices, tiles break in-picture prediction dependencies as well as entropy decoding dependencies. However, slices do not need to be included into individual NAL units, which is similar to the usage for WPP in this regard. Hence tiles are not used for MTU size matching. Each tile can be processed by one processor/core, and the inter-processor/inter-core communication used for in-picture prediction between processing units decoding neighboring tiles is limited to conveying a shared slice header in cases a slice is spanning more than one tile. Such communication can also include loop filtering related sharing of reconstructed samples and metadata. When more than one tile or WPP segment is included in a slice, the entry point byte offset for each tile or WPP segment other than the first one in the slice is signaled in the slice header.

For simplicity, restrictions on the application of the four different picture partitioning schemes have been specified in HEVC. A coded video sequence may not include both tiles and wavefronts for most of the profiles specified in HEVC. For each slice and tile, either or both of the following conditions should be fulfilled. A first condition is when all coded treeblocks in a slice belong to the same tile. A second condition is when all coded treeblocks in a tile are included in the same slice. Finally, a wavefront segment contains exactly one CTB row. Further, when WPP is in use, when a slice starts within a CTB row, the slice should end in the same CTB row.

An example amendment to HEVC specifies three motion constrained tile set (MCTS) related SEI messages. These include a temporal MCTSs SEI message, a MCTSs extraction information set SEI message, and a MCTSs extraction information nesting SEI message. The temporal MCTSs SEI message indicates the existence of MCTSs in the bitstream and signals the MCTSs. For each MCTS, motion vectors are restricted to point to full-sample locations inside the MCTS and to fractional-sample locations that employ only full-sample locations inside the MCTS for interpolation. Further, the usage of motion vector candidates for temporal motion vector prediction derived from blocks outside the MCTS is disallowed. In this way, each MCTS may be independently decoded without reference to tiles outside the MCTS.

The MCTSs extraction information set SEI message provides supplemental information that can be used in the MCTS sub-bitstream extraction to generate a conforming bitstream for an MCTS set. The MCTS sub-bitstream extraction is specified as part of the semantics of the MCTSs extraction information sets SEI message. The information includes a number of extraction information sets. The extraction information sets each define a number of MCTS sets and contain RBSP bytes of the replacement VPSs, SPSs, and PPSs to be used during the MCTS sub-bitstream extraction process. When extracting a sub-bitstream according to the MCTS sub-bitstream extraction process, parameter sets, such as VPSs, SPSs, and PPSs, are rewritten or replaced. Further, slice headers are updated because one or more of the slice address related syntax elements, such as first_slice_segment_in_pic_flag and slice_segment_address, should have different values.

Picture partitioning and subpictures in VVC is now discussed. In VVC, a picture may be divided into one or more tile rows and one or more tile columns. A tile is a sequence of CTUs that covers a rectangular region of a picture. The CTUs in a tile are scanned in raster scan order within the tile. A slice includes an integer number of complete tiles or an integer number of consecutive complete CTU rows within a tile of a picture. VVC supports raster-scan slice mode and rectangular slice mode for managing slices. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to the slice. A subpicture contains one or more slices that collectively cover a rectangular region of a picture.

FIG. 1 is a schematic diagram of an example picture partitioned into slices, sub-pictures, tiles, and CTUs. In schematic diagram 100, the picture has been partitioned into eighteen tiles, twenty four slices, twenty four subpictures, and one hundred twenty CTUs. The subpicture concept and functionality are now discussed. In VVC, each subpicture includes one or more complete rectangular slices that collectively cover a rectangular region of the picture as shown in schematic diagram 100. A subpicture may be specified to be extractable. An extractable sub-picture is coded independently of other subpictures of the same picture and of earlier pictures in decoding order. A sub-picture may also be specified to be not extractable, and hence not coded independently of other subpictures. Regardless of whether a subpicture is extractable or not, the encoder can control whether in-loop filtering is applied across the subpicture boundaries individually for each subpicture. In-loop filtering includes application of a deblocking filter, a SAO filter, and/or and an ALF filter.

Subpictures are similar to the MCTSs in HEVC. They both allow independent coding and extraction of a rectangular subset of a sequence of coded pictures, for use cases like viewport-dependent three hundred sixty degree (360°) video streaming optimization and region of interest (ROI) applications.

In streaming of 360° video, also known as omnidirectional video, at any particular moment only a subset of an entire omnidirectional video sphere is rendered to the user. The subset is denoted as a current viewport. The user can turn their head at any time to change the viewing orientation and consequently can change the current viewport. At least some lower-quality representation of the area not covered by the current viewport may be made available at the client. Accordingly, the area outside the viewport can be made ready to be rendered to the user in case the user suddenly changes their viewing orientation to anywhere on the sphere. A high-quality representation of the omnidirectional video is only used for the current viewport that is being rendered to the user at any given moment. Splitting the high-quality representation of the entire omnidirectional video into sub-pictures at an appropriate granularity enables such an optimization as shown in schematic diagram 100. In this example, the twelve sub-pictures on the left-hand side are high-resolution subpictures as used for the current viewport, and hence are depicted as containing more CTUs. The remaining twelve subpictures on the right-hand side are the lower resolution sub-pictures used outside the current viewport of the omnidirectional video.

Figure 2:
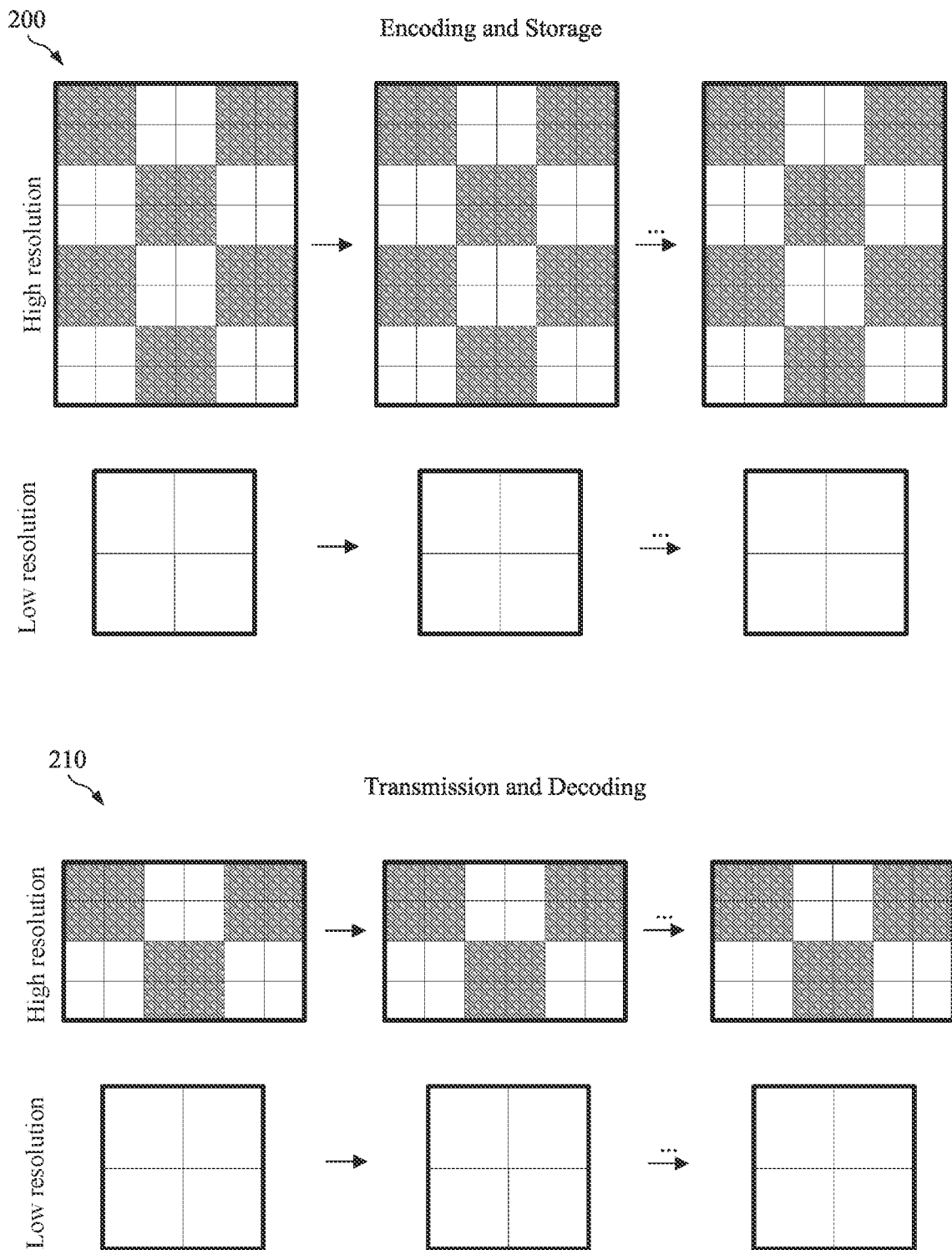
FIG. 2 is a schematic diagram of an example sub-picture based viewport dependent three-hundred sixty degree (360°) video delivery scheme.

FIG. 2 is a schematic diagram of an example sub-picture based viewport dependent 360° video delivery scheme including an encoding and storage video 200 and a transmission and decoding video 210. At the encoding and storage video 200 includes the entire video at both high resolution and low resolution. The transmission and decoding video 210 includes a portion of the encoding and storage video 200. For example, the transmission and decoding video 210 can include the same low resolution images as the encoding and storage video 200. Further, the transmission and decoding video 210 can include the high resolution subpictures associated with the current viewport being displayed to the user and may exclude the high resolution subpictures outside the current viewport.

As such, FIG. 2 illustrates an example subpicture-based viewport-dependent 360° video delivery scheme that only employs subpictures for the higher-resolution representation video. The lower-resolution representation of the full video does not use subpictures and can be coded with less frequent random access points (RAPs) than the higher-resolution representation. RAPs are less compressed than other images, and hence reducing the number of RAPs decreases the bitstream size. The client receives the full video in the lower-resolution. For the higher-resolution video, the client only receives and decodes the subpictures that cover the current viewport.

Differences between subpictures and MCTSs are now discussed. There are several design differences between subpictures and MCTSs. First, the subpictures feature in VVC allows motion vectors of a coding block to point outside of the subpicture even when the subpicture is extractable. This can be accomplished by applying sample padding at subpicture boundaries in a manner similar to padding employed at picture boundaries. Second, additional changes are introduced for the selection and derivation of motion vectors in the merge mode and in the decoder side motion vector refinement process of VVC. This allows higher coding efficiency compared to the non-normative motion constraints applied at encoder-side for MCTSs. Third, rewriting of SHs and PH NAL units when present, is not needed when extracting one or more extractable subpictures from a sequence of pictures to create a sub-bitstream that is a conforming bitstream. In sub-bitstream extractions based on HEVC MCTSs, rewriting of SHs may be needed. Note that in both HEVC MCTSs extraction and VVC subpictures extraction, rewriting of SPSs and PPSs may be needed. However, there may only be a few parameter sets in a bitstream, while each picture has at least one slice. Therefore, rewriting of SHs can be a significant burden for application systems. Fourth, slices of different subpictures within a picture are allowed to have different NAL unit types. This is often referred to as mixed NAL unit types or mixed subpicture types within a picture as discussed in more detail below. Fifth, VVC specifies HRD and level definitions for subpicture sequences. Thus, the conformance of the sub-bitstream of each extractable subpicture sequence can be ensured by encoders.

Mixed subpicture types within a picture are now discussed. In AVC and HEVC, all VCL NAL units in a picture may be required to have the same NAL unit type. VVC introduces the option to mix subpictures with certain different VCL NAL unit types within a picture. This provides support for random access not only at the picture level but also at the subpicture level. In VVC, VCL NAL units within a subpicture may still be required to have the same NAL unit type.

The capability of random accessing from IRAP subpictures is beneficial for 360° video applications. In viewport-dependent 360° video delivery schemes similar to the one shown FIG. 2, the content of spatially neighboring viewports largely overlaps. Accordingly, only a fraction of the subpictures in a viewport are replaced by new subpictures during a viewport orientation change. Hence, most subpictures remain in the viewport. Subpicture sequences that are newly introduced into the viewport must begin with IRAP slices, but significant reduction in overall transmission bit rate can be achieved when the remaining subpictures are allowed to carry out inter-prediction despite viewport changes.

The indication of whether a picture contains just a single type of NAL units or more than one type can be provided in the PPS referred to by the picture, for example by using a flag called PPS mixed NAL unit types in picture flag (pps_mixed_nalu_types_in_pic_flag). In this way, a picture may include subpictures containing IRAP slices and sub-pictures containing trailing slices at the same time. A few other combinations of different NAL unit types within a picture are also allowed. For example, a mixed NAL unit picture may include leading picture slices of NAL unit types RASL and RADL, which allows the merging of subpicture sequences with open-group of pictures (GOP) and close-GOP coding structures are extracted from different bitstreams into one bitstream.

Subpicture layout and subpicture identifier (ID) signaling is now discussed. The layout of subpictures in VVC is signaled in the SPS, and is therefore constant within a coded layer video sequence (CLVS). Each subpicture is signaled by the position of the picture's top-left CTU and the picture's width and height in number of CTUs. Therefore, the signaling ensures that a subpicture covers a rectangular region of the picture with CTU granularity. The order in which the subpictures are signaled in the SPS determines the index of each subpicture within the picture.

Figure 3:
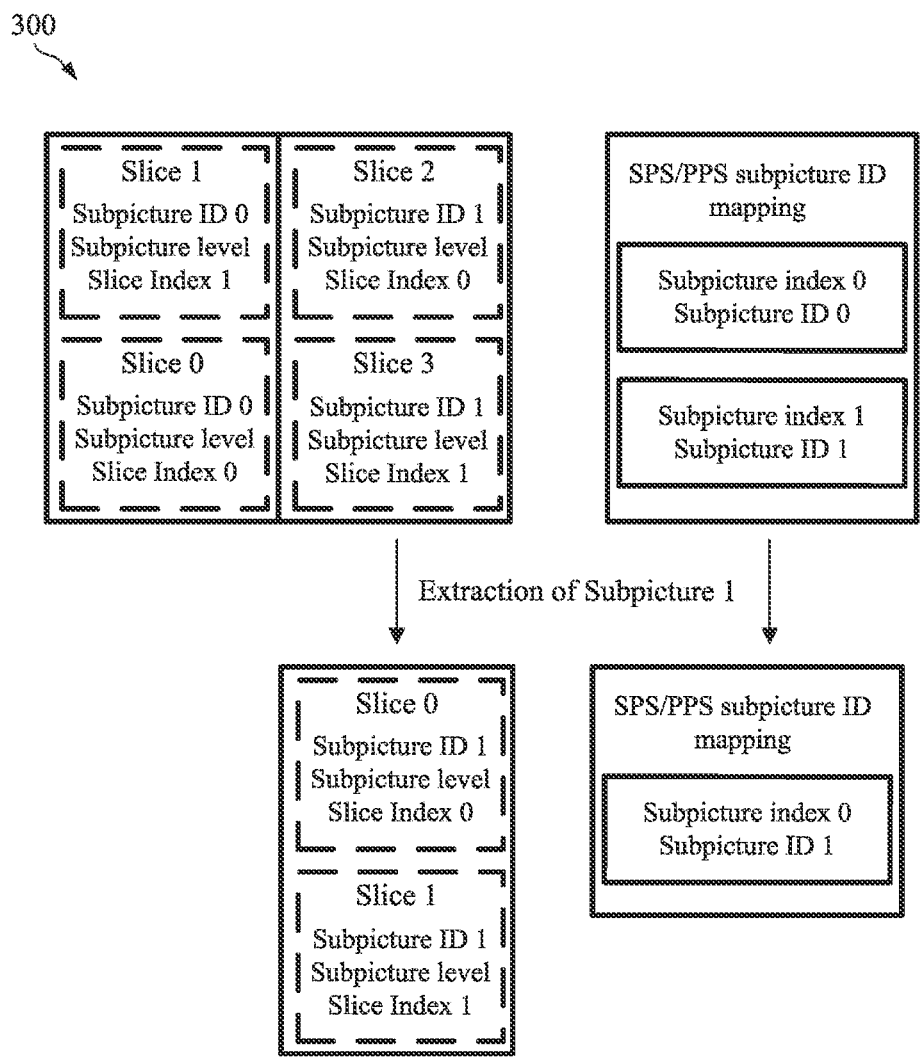
FIG. 3 is a schematic diagram of an example mechanism for extracting a subpicture from a bitstream.

FIG. 3 is a schematic diagram 300 of an example mechanism for extracting a subpicture from a bitstream. For enabling extraction and merging of subpicture sequences without rewriting of SHs or PHs, the slice addressing scheme in VVC is based on subpicture IDs and a subpicture-specific slice index to associate slices to subpictures. The subpicture ID of the subpicture containing the slice and the subpicture-level slice index are signaled in the SH. The value of subpicture ID of a particular subpicture can be different from the value of a corresponding subpicture index. A mapping between the sub-picture ID and sub-picture index is either signaled in the SPS or PPS, but not both, or is implicitly inferred. When present, the subpicture ID mapping is rewritten or added when rewriting the SPSs and PPSs during the subpicture sub-bitstream extraction process. The subpicture ID and the subpicture-level slice index together indicate to the decoder the exact position of the first decoded CTU of a slice within the DPB slot of the decoded picture. As shown in schematic diagram 300, the subpicture ID of a subpicture remains unchanged after sub-bitstream extraction, while the subpicture index may change. Even when the raster-scan CTU address of the first CTU in a slice in the subpicture has changed compared to the value in the original bitstream, the unchanged values of subpicture ID and subpicture-level slice index in the respective SH still correctly indicate the position of each CTU in the decoded picture of the extracted sub-bitstream. Schematic diagram 300 illustrates the usage of subpicture ID, subpicture index, and subpicture-level slice index to enable subpicture extraction with an example containing two subpictures and four slices.

Similar to subpicture extraction, the signaling for subpictures allows merging several subpictures from different bitstreams into a single bitstream by only rewriting the SPSs and PPSs. This mechanism may require that the different bitstreams are coordinately generated, for example by using distinct subpicture IDs and otherwise mostly aligned SPS, PPS, and PH parameters such as CTU size, chroma format, coding tools, etc. While subpictures and slices are independently signaled in the SPS and PPS, respectively, there are inherent reciprocal constraints between the subpicture and slice layouts in order to form a conformant bitstream. First, the presence of subpictures may require usage of rectangular slices and may forbid raster-scan slices. Second, the slices of a given subpicture should be consecutive NAL units in decoding order, which causes the subpicture layout to constrain the order of coded slice NAL units within the bitstream.

Some basics in the VVC video file format are now discussed. For example, types of tracks for carriage of VVC elementary streams are now discussed. This document specifies the following types of tracks for carriage of VVC elementary streams. A VVC track represents a VVC elementary stream by including NAL units in the track's samples and/or sample entries. The VVC track may also associate other VVC tracks containing other layers and/or sublayers of the VVC elementary stream through a 'vvcb' entity group, a 'vopi' sample group, an 'opeg' entity group, or combinations thereof. Further, a VVC track may associate other VVC tracks by referencing VVC subpicture tracks. When a VVC track references VVC subpicture tracks, the VVC track is referred to as a VVC base track. A VVC base track should not contain VCL NAL units and should not be referred to by a VVC track through a 'vvcN' track reference.

A VVC non-VCL track is a track that contains only non-VCL NAL units and is referred to by a VVC track through a 'vvcN' track reference. A VVC non-VCL track could contain APSs, which carry ALF, LMCS, or scaling list parameters. Such parameters may be included with or without other non-VCL NAL units. Such parameters are hence stored in and transmitted through a track that is separate from the track containing the VCL NAL units. A VVC non-VCL track may also contain picture header NAL units, with or without APS NAL units and/or other non-VCL NAL units. The picture header NAL units can hence be stored in and transmitted through a track that is separate from the track containing the VCL NAL units.

A VVC subpicture track contains either a sequence of one or more VVC subpictures forming a rectangular region or a sequence of one or more complete slices forming a rectangular region. A sample of a VVC subpicture track contains either one or more complete subpictures that form a rectangular region or one or more complete slices that form a rectangular region.

VVC non-VCL tracks and VVC subpicture tracks enable a delivery of VVC video in streaming applications. These tracks can each be carried in DASH representations of their own. For decoding and rendering of a subset of the tracks, the DASH representations containing the subset of the VVC subpicture tracks as well as the DASH representation containing the non-VCL tracks can be requested by the client on a segment by segment basis. In this way, redundant transmission of APSs, other non-VCL NAL units, and unnecessary subpictures can be avoided. Further, when a VVC subpicture track contains one or more complete slices but not all slices of a subpicture, all slices in the subpicture track belong to the same subpicture. Further, in this case any VVC base track that references the subpicture track, for example through the 'subp' track reference, also references the subpicture track(s) that contain(s) the remaining slices from the same subpicture.

Subpicture entity groups are now discussed. Subpicture entity groups are defined to provide level information indicating conformance of a merged bitstream created form several VVC subpicture tracks. VVC base tracks provide another mechanism for merging VVC subpicture tracks. The implicit reconstruction process based on the subpicture entity groups may require modification of parameter sets. The subpicture entity groups give guidance to ease parameter set generation for the reconstructed bitstreams. When the subpicture tracks within the group that are to be jointly decoded are interchangeable the SubpicCommonGroupBox indicates the combinatorial rules and the level_idc of a resulting combination when decoded jointly. The tracks are interchangeable when the player can select any set of a num_active_tracks subpicture tracks from a group with the same level contribution. When coded subpictures with different properties, such as different resolutions, are selected to be jointly decoded, the SubpicMultipleGroupsBox indicates the combinatorial rules and the level_idc of a resulting combination when decoded jointly. All the entity_id values included in the subpicture entity groups should identify VVC subpicture tracks. The SubpicCommonGroupBox and SubpicMultipleGroupsBox, when present, should be contained in the GroupsListBox in the file-level MetaBox and should not be contained in MetaBoxes of other levels.

An example syntax of a subpicture common group box is as follows.

```
aligned(8) class SubpicCommonGroupBox extends
EntityToGroupBox('acgl',0,0)
{
    unsigned int(8) level_idc;
    bit(8) reserved = 0;
    unsigned int(16) num_active_tracks;
}
```

An example of semantics for a subpicture common group box is as follows. level_idc specifies the level to which any selection of num_active_tracks entities among the entity group conforms. num_active_tracks specifies the number of tracks for which the value of level_idc is provided.

An example syntax for a subpicture multiple groups box is as follows.

```
aligned(8) class SubpicMultipleGroupsBox extends
EntityToGroupBox('amgl',0,0)
{
    unsigned int(8) level_idc;
    unsigned int(16) num_subgroup_ids;
    subgroupIdLen = (num_subgroup_ids >= (1 << 8)) ? 16 : 8;
    for (i = 0; i < num_entities_in_group; i++)
        unsigned int(subgroupIdLen) track_subgroup_id[i];
    for (i = 0; i < num_subgroup_ids; i++)
        unsigned int(16) num_active_tracks[i];
}
```

An example of semantics for a subpicture multiple groups box is as follows. level_idc specifies the level to which the combination of selecting any num_active_tracks[i] tracks among the subgroup with ID equal to i for all values of i in the range of 0 to num_subgroup_ids−1, inclusive, conforms. num_subgroup_ids specifies the number of separate subgroups, each identified by the same value of track_subgroup_id[i]. Different subgroups are identified by different values of track_subgroup_id[i]. track_subgroup_id[i] specifies the subgroup ID for the i-th track in this entity group. subgroup ID values shall range from 0 to num_subgroup_ids−1, inclusive. num_active_tracks[i] specifies the number of tracks among the subgroup with ID equal to i that is documented in level_idc.

The following are example technical problems solved by disclosed technical solutions. For example, the subpicture entity groups work for cases where the relevant subpicture information is consistent throughout the entire time duration of the tracks. However, this is not always the case. For example, different CVSs may have different levels for a particular subpicture sequence. In that case, sample groups should be used instead, to carry essentially the same information, but allow certain information to differ for different samples (e.g., CVSs).

Figure 4:
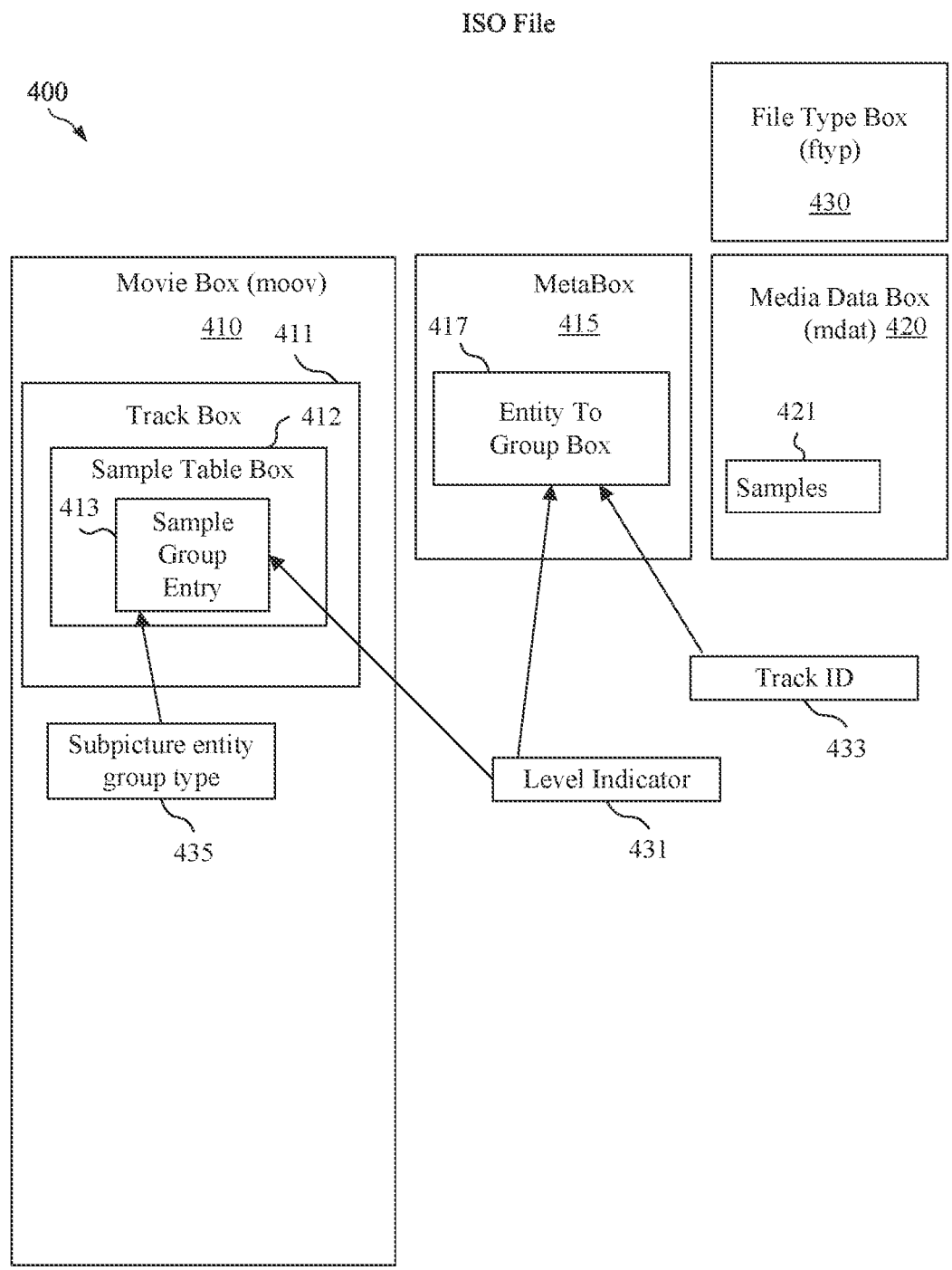
FIG. 4 is a schematic diagram of a media file stored in International Organization for Standardization (ISO) base media file format (ISOBMFF).

FIG. 4 is a schematic diagram of a media file 400 stored in ISOBMFF. For example, a media file 400 can contain an encoded bitstream and can be stored in ISOBMFF for transmission to a decoder. By organizing the media file 400 in ISOBMFF, the sub-sets of the media file 400, such as sub-bitstreams at specific resolutions, screen sizes, frame rates, etc., can be selected and transmitted to the decoder. Further, organizing the media file 400 in ISOBMFF allows the decoder to locate the relevant portions of the media file 400 for decoding and display. An ISOBMFF media file 400 is stored in a plurality of boxes that carry objects and/or data associated with a media content or a media presentation. For example, media file 400 may comprise a file type box (e.g. ftyp) 430, a movie box (e.g. moov) 410, and a media data box (e.g. mdat) 420. Such boxes can further include other boxes in a nested fashion to store all of the relevant data in the media data file 400.

A file type box 430 may carry data that describes the entire file, and hence may carry file level data. Accordingly, a file-level box is any box that contains data relevant to the entire media file 400. For example, the file type box 430 may comprise a file type that indicates a version number of an ISO specification and/or compatibility information of the media file 400.

A movie box 410 may carry data that describes a movie contained in the media file, and hence may carry movie-level data. A movie-level box is any box that contains data that describes an entire movie contained in the media file 400. A movie box 410 can contain a wide range of sub-boxes that are used to contain data for various uses. For example, the movie box 410 contains track boxes 411, denoted as trak, that carry metadata describing a track of a media presentation. For example, a track box 411 may carry temporal and/or spatial information describing how corresponding samples 421 are arranged into a video for display. It should be noted that data that describes a track is track-level data, and hence any box that describes a track is a track-level box. A track box 411 may carry many different types of boxes that are specific to the track described within the corresponding track box 411. For example, the track box 411 may contain a sample table box 412. A sample table box 412, denoted as stbl, is a box that contains the time and data indexing of the media samples 421 associated with a track. Among other items, the sample table box 412 may contain sample group entries 413. A sample group entry 413 contains data describing properties of a sample group. A sample group is any grouping of samples 421 that are associated with the corresponding track described by the track box 411. Accordingly, a sample group, as described by the sample table box 412, can carry information for (e.g., describing) a set of picture/subpictures.

The movie box 410 may also comprise a MetaBox 415, which is a structure for carrying untimed metadata. The MetaBox 415 may be contained in the movie box 410 as shown, and hence may be considered a movie level box when the metadata is related to the entire movie. In some examples, the MetaBox 415 may also be contained in a track box 411, and hence may be considered a track level box when the metadata is related to a corresponding track. The MetaBox 415 may contain various boxes for carrying metadata. For example, the MetaBox 415 may contain an entity to group box 417, which is a box that contains metadata describing a corresponding entity group, such as a grouping type of an entity group. Accordingly, the entity to group box specifies the subpicture entity group. An entity group is a group of items, such as tracks in a track box 411, that share a particular characteristic and/or share a particular relationship.

A media data box 420 comprises interleaved and time-ordered media data (e.g. coded video images and/or audio in one more media tracks) of the media presentation. For example, the media data box 420 may comprise a bitstream of video data coded according to VVC, AVC, HEVC, etc. A media data box 420 may include video images, audio, text, or other media data for display to the user. Such video images, audio, text, or other media data may be collectively referred to as samples 421.

As noted above, the present disclosure relates to the scenario where a sequence of pictures is partitioned into different spatial regions known as subpictures. For example, a top region of each picture could be included in a first subpicture and a bottom portion of each picture could be included in a second subpicture. This allows different regions to be displayed independently. This also allows different regions to be coded differently, for example by applying different coding tools, constraints, etc. The subpictures are included in separate track boxes 411, resulting in sub-picture tracks. Further, pictures, and therefore subpictures, are coded according to a profile, tier, and level, which describes coding constraints that are applied to the pictures and subpictures. Hence, a profile, tier, and level indicates that a corresponding video can be decoded by any decoder that contains hardware that is sufficient to decode at the indicated profile, tier, and level. For example, a profile may indicate a set of coding tools used to code a video, a tier may indicate a maximum bit rate for the video, and a level may indicate various additional constraints applied to the video, such as maximum sample rate, maximum luma picture size, maximum number of slice segments per picture, etc. In some systems, level information for subpicture tracks in the track boxes 411 is signaled at the file level. However, this approach may not allow different subpicture tracks and/or different samples within the same subpicture track to have different levels.

Disclosed herein are mechanisms to address one or more of the problems listed above. The present disclosure addresses this issue by employing a level indicator 431 for subpicture tracks contained in track boxes 411. For example, the sub-picture tracks in the track boxes 411 can be grouped into entity groups in an entity to group box 417. Further, samples in the sub-picture tracks can be grouped into sample groups by sample group entries 413. A level indicator 431 can then be used to indicate the level for either sample groups of a track via sample group signaling or entire tracks via entity group signaling. For example, the level indicator 431 can indicate level information for groups of subpicture samples 421 organized into tracks, and hence described in corresponding track boxes 411. Further, subpictures with different levels can be organized into different samples groups. A level indicator 431 can then be included in a sample group entry 413 that describes the corresponding sample group. This allows different sample groups within the same track to have different levels as indicated by the level indicator. In an example implementation, subpictures with the same level can be organized into a subpicture level information sample group described by a corresponding sample group entry 413. A level indicator 431 can then be included in the sample group entry 413 to describe the level information for the subpicture group. In an example, a subpicture entity group type indication 435 may be employed to indicate a subpicture entity group type associated with the sample group. The subpicture entity group type indication 435 can be signaled in the sample group entry 413 of the sample group. For example, the subpicture entity group type indication 435 can include a one bit flag. In another example, the subpicture entity group type indication 435 can include a 24-bit field that specifies the grouping type of the associated subpicture entity group as indicated by the entity to group box 417. In a further example, the subpicture entity group type indication 435 may include a group type parameter (group_type_parameter) associated with the sample group as indicated in the sample group entry 413. For example, the sample table box 412 may include sample to group boxes (SampleToGroupBoxes) that each describe subpicture level information for a sample group. A SampleToGroupBox can contain a group_type_parameter that acts as a subpicture entity group type indication 435. In an example, the group_type_parameter is set to acgl when indicating the grouping type of the subpicture entity group is a subpicture common group and is set to amgl when indicating the grouping type of the subpicture entity group is a subpicture multiple group. In another example, the group_type_parameter may include thirty-two bits, and one bit of the group type parameter may be used to signal a subpicture common group flag (subpicture_common_group_flag) to indicate whether the grouping type of the subpicture entity group is a subpicture common group or a subpicture multiple group. In yet another example, a group identifier (ID) in the entity to group box 417 can also be signaled in the sample group entry 413 for the sample group in order to correlate the sample group for samples 421 with the entity group of samples 421.

In another example, a set of subpicture tracks in corresponding track boxes 411 are organized into subpicture entity groups as indicated in the entity to group box 417. A level indicator 431 for the subpictures may be signaled either in the entity to group box 417 of the subpicture entity group or in the sample group entry 413 of a sample group. For example, the level indicator 431 can be signaled in the entity to group box 417 for the subpicture entity group when the level is static for all samples 421 in the set of subpicture tracks described by the track box 411. In another example, the level indicator 431 can be signaled in the sample group entry 413 of the sample group when the level may not be static for all samples 421 in the set of subpicture tracks described by the track box 411. In one example, an indication, such as a flag, can be signaled in the entity to group box 417 of the subpicture entity group. The flag can be used as a level indicator 431 and used to indicate whether the level is static for all samples 421 in the set of subpicture tracks described by the track box 411.

In another example, a set of subpicture tracks described by the track box 411 may be organized into subpicture entity groups as indicated in the entity to group box 417. When a level indicator 431 for the subpictures is signaled for a sample group, a track ID 433 of the track containing the sample group can be signaled in the entity to group box 417 of the subpicture entity group, for example via a level information track ID field (level_info_track_id). For example, a rule can specify that the track with track ID 433 equal to level_info_track_id should or shall be a track that contains picture header network abstraction layer (NAL) units, and hence should be a VVC base track. In another example, a rule can specify that the track with track ID 433 equal to level_info_track_id shall be a VVC base track.

To solve the above problems, and others, methods as summarized below are disclosed. The items should be considered as examples to explain the general concepts and should not be interpreted in a narrow way. Furthermore, these items can be applied individually or combined in any manner.

Example 1

In one example, certain information, such as a level indicator, for sets of subpicture tracks in a subpicture entity group may be signaled using one or more sample groups.

Example 2

In one example, certain information, such as a level indicator, for a set of subpicture tracks in a subpicture entity group may be signaled either in the entity to group box of the subpicture entity group or in the sample group entry of a sample group.

Example 3

In one example, the information, such as the level indicator, is signaled in the subpicture entity group when the information is static for all samples in the set of subpicture tracks. In one example, the information, such as the level indicator, is signaled in a sample group when the information may be not static for all samples in the set of subpicture tracks. In one example, an indication, such as a flag, indicates whether certain information, such as a level indicator, is static for all samples in the set of subpicture tracks. The indication may be signaled in the entity to group box of the subpicture entity group.

Example 4

In one example, when information, such as a level indicator, for a set of subpicture tracks in a subpicture entity group is signaled in a sample group, the track ID of the track containing the sample group is signaled in the entity to group box of the subpicture entity group, for example via the field level_info_track_id.

Example 5

In one example, a rule may specify that the track with a track identifier (track_ID) equal to a level information track_ID (level_info_track_id) should be a track that contains picture header NAL units, such as a VVC base track. In one example, a rule may specify that the track with track_ID equal to level_info_track_id shall be a track that contains picture header NAL units, such as a VVC base track. In one example, a rule may specify that the track with track_ID equal to level_info_track_id shall be a VVC base track.

Example 6

In one example, a sample group, for example named subpicture level information sample group, is specified to signal certain information, such as a level indicator, for a set of subpicture tracks in a subpicture entity group.

Example 7

In one example, the information, such as the level indicator, is signaled in the sample group entry of the sample group. In one example, an indication of the type of subpicture entity group associated with the sample group is signaled in the sample group entry of the sample group. In one example, the indication is signaled using a one-bit flag. In one example, the indication is signaled using a 24-bit field that specifies the grouping type of the associated subpicture entity group. In one example, an indication of the type of subpicture entity group associated with the sample group is signaled using a grouping type parameter (grouping_type_parameter) of the sample group. In one example, a rule may specify that all sample to group boxes (SampleToGroupBoxes) for the subpicture level information sample group shall include a grouping_type_parameter. The value of grouping_type_parameter is set equal to 'acgl' to specify that the grouping type (grouping_type) of the associated subpicture entity group is equal to 'acgl'. The value of grouping_type_parameter is set equal to 'amgl' to specify that the grouping_type of the associated subpicture entity group is equal to 'amgl'.

In one example, a rule may specify that all SampleToGroupBoxes for the subpicture level information sample group shall include grouping_type_parameter. One bit of the 32 bits of grouping_type_parameter can be used to signal the subpic_common_group_flag. In one example, the group_id in the entity to group box (EntityToGroupBox) of the associated subpicture entity group is signaled in the sample group entry of the sample group.

Below are some example embodiments for some of the aspects summarized above, some of which can be applied to the standard specification for VVC video file format. The relevant parts that have been added or modified are denoted in underline bold and the deleted parts are denoted in bold italics.

A first embodiment of the preceding examples is as follows.

11.4.20 Subpicture level information sample group.
11.4.20 Definition. When there is a subpicture entity group with level is static flag equal to 0 is present, a subpicture level information sample group ('spli') shall be present in the track with track_ID equal to the level_info_track_id of the subpicture entity group. A subpicture level information sample group provides level information for one or more group of subpicture tracks indicated by a subpicture entity group, referred to as the associated subpicture entity group. Information for identifying the associated subpicture entity group is signalled in the sample group entry. The grouping_type_parameter field for the subpicture level information sample group is undefined.

11.4.20.2 Syntax.

```
aligned(8) class SubpicLevelInfoEntry( )
extends VisualSampleGroupEntry('spli')
{
    unsigned int(8) level_idc;
    unsigned int(1) subpic_common_group_flag;
    bit(7) reserved = 0;
    unsigned int(32) subpic_entity_group_id;
}
```

11.4.20.3 Semantics. level_idc specifies the level to which the set of samples that are members of this sample group in each combination of subpicture tracks indicated by the associated subpicture entity group conforms. subpic_common_group_flag equal to 1 specifies that the grouping type of the associated subpicture entity group is equal to 'acgl'. subpic_common_group_flag equal to 0 specifies that the grouping_type of the associated subpicture entity group is equal to 'amgl'. subpic_entity_group_id specifies the group_id in the EntityToGroupBox of the associated subpicture entity group.

11.5.1 Subpicture entity groups. 11.5.1.1 General. Subpicture entity groups are defined to provide level information indicating conformance of a merged bitstream out of several VVC subpicture tracks. NOTE: The VVC base tracks provides another mechanism for merging VVC subpicture tracks. The implicit reconstruction process based on the subpicture entity groups requires modification of parameter sets. The subpicture entity groups give guidance to ease parameter set generation for the reconstructed bitstreams. When the subpicture tracks within the group that are to be jointly decoded are interchangeable, i.e. the player can select any set of num_active_tracks subpicture tracks from a group with the same level contribution, the SubpicCommonGroupBox indicates the combinatorial rules and the level_idc of a resulting combination when decoded jointly. When there are coded subpictures with different properties, e.g. different resolutions, which are selected to be jointly decoded, the SubpicMultipleGroupsBox indicates the combinatorial rules and the level_idc of a resulting combination when decoded jointly. All the entity_id values included in the subpicture entity groups shall identify VVC subpicture tracks. When present, SubpicCommonGroupBox and SubpicMultipleGroupsBox shall be contained in the GroupsListBox in the file-level MetaBox and shall not be contained in MetaBoxes of other levels.

11.5.1.2 Syntax of Subpicture Common Group Box.

```
aligned(8) class SubpicCommonGroupBox extends
EntityToGroupBox('acgl',0,0)
{
    unsigned int(1) level_is_static_flag;
    bit(7) reserved = 0;
    if( level_is_static_flag )
        unsigned int(8) level_idc;
    else
        unsigned_int(32) level_info_track_id;
        bit(8)reserved=0;
    unsigned int(16) num_active_tracks;
}
```

11.5.1.3 Semantics of subpicture common group box. level_is_static_flag equal to 1 specifies that the level to which any set of num_active_tracks entities among the current entity group conforms is static for all samples in the selection of tracks and is indicated by the level_idc field in the current SubpicCommonGroupBox. level_is_static_flag equal to 0 specifies that the level for such a selection, for a particular set of samples, is indicated by the level_idc field in the sample group entry of the associated subpicture level information sample group, which is in the track with track_ID equal to level_info_track_id and has subpic_common_group_flag equal to 1 and subpic_entity_group_id equal to the group_id in the EntityToGroupBox of the current entity group. The particular set of samples is the set of samples that are members of the associated subpicture level information sample group. level_idc specifies the level to which any selection set of num_active_tracks entities among the current entity group conforms. level_info_track_id specifies the track containing the associated subpicture level information sample group. The track with track_ID equal to level_info_track_id should be a track that contains picture header NAL units, e.g., a VVC base track. num_active_tracks specifies the number of tracks for which the value of level_idc is provided.

11.5.1.4 Syntax of Subpicture Multiple Groups Box

```
aligned(8) class SubpicMultipleGroupsBox extends
EntityToGroupBox('amgl',0,0)
{
    unsigned int(1) level_is_static_flag;
    bit(7) reserved = 0;
    if( level_is_static_flag )
        unsigned int(8) level_idc;
    else
        unsigned_int(32) level_info_track_id;
    unsigned int(16) num_subgroup_ids;
    subgroupIdLen = (num_subgroup_ids >= (1 << 8)) ? 16 : 8;
    for (i = 0; i < num_entities_in_group; i++)
        unsigned int(subgroupIdLen) track_subgroup_id[i];
    for (i = 0; i < num_subgroup_ids; i++)
        unsigned int(16) num_active_tracks[i];
}
```

11.5.1.5 Semantics of subpicture multiple groups box. level_is_static_flag equal to 1 specifies that the level to which the set of any num_active_tracks[i] tracks among the subgroup with ID equal to i for all values of i in the range of 0 to num_subgroup_ids−1, inclusive, conforms is static for all samples in the subpicture tracks included in the current entity group, and is indicated by the level_idc field in the current SubpicMultipleGroupsBox. level_is_static_flag equal to 0 specifies that the level for such a combination, for a particular set of samples, is indicated by the level_idc field in the sample group entry of the associated subpicture level information sample group, which is in the track with track_ID equal to level_info_track_id and has subpic_common_group_flag equal to 0 and subpic_entity_group_id equal to the group_id in the EntityToGroupBox of the current entity group. The particular set of samples is the set of samples that are members of the associated subpicture level information sample group.

level_idc specifies the level to which the combination of selecting set of any num_active_tracks[i] tracks among the subgroup with ID equal to i for all values of i in the range of 0 to num_subgroup_ids−1, inclusive, conforms. level_info_track_id specifies the track containing the associated subpicture level information sample group. The track with track_ID equal to level_info_track_id should be a track that contains picture header NAL units, e.g., a VVC base track. num_subgroup_ids specifies the number of separate subgroups, each identified by the same value of track_subgroup_id[i]. Different subgroups are identified by different values of track_subgroup_id[i]. track_subgroup_id[i] specifies the subgroup ID for the i-th track in this entity group. subgroup ID values shall range from 0 to num_subgroup_ids−1, inclusive. num_active_tracks[i] specifies the number of tracks among the subgroup with ID equal to i that is documented in level_idc.

Figure 5:
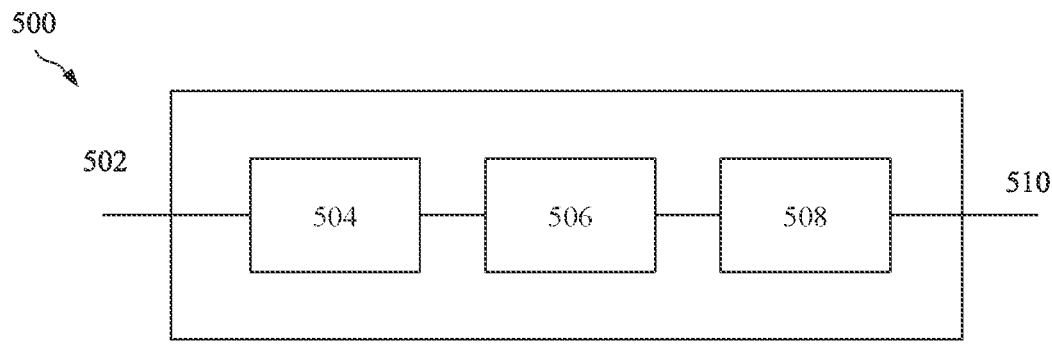
FIG. 5 is a block diagram showing an example video processing system.

FIG. 5 is a block diagram showing an example video processing system 500 in which various techniques disclosed herein may be implemented. Various implementations may include some or all of the components of the system 500. The system 500 may include input 502 for receiving video content. The video content may be received in a raw or uncompressed format, e.g., 8 or 10 bit multi-component pixel values, or may be in a compressed or encoded format. The input 502 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 500 may include a coding component 504 that may implement the various coding or encoding methods described in the present document. The coding component 504 may reduce the average bitrate of video from the input 502 to the output of the coding component 504 to produce a coded representation of the video. The coding techniques are therefore sometimes called video compression or video transcoding techniques. The output of the coding component 504 may be either stored, or transmitted via a communication connected, as represented by the component 506. The stored or communicated bitstream (or coded) representation of the video received at the input 502 may be used by a component 508 for generating pixel values or displayable video that is sent to a display interface 510. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 6:
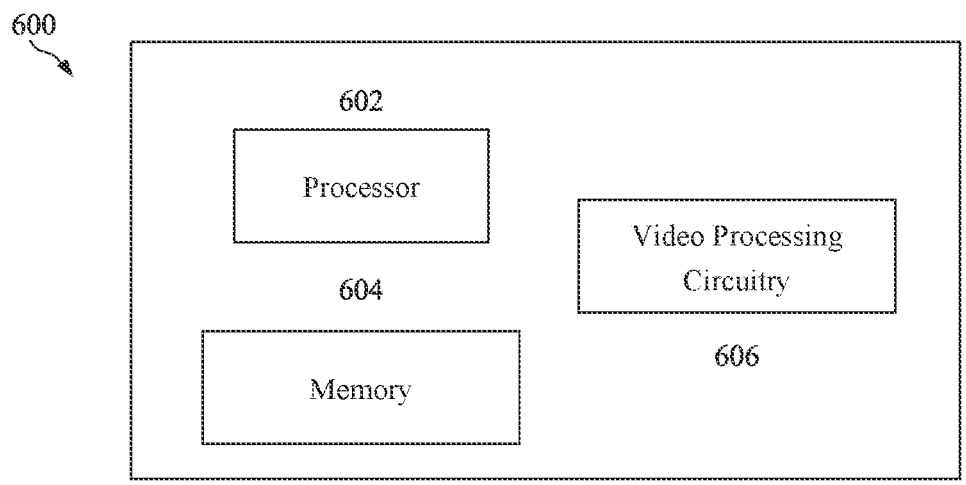
FIG. 6 is a block diagram of an example video processing apparatus.

FIG. 6 is a block diagram of an example video processing apparatus 600. The apparatus 600 may be used to implement one or more of the methods described herein. The apparatus 600 may be embodied in a smartphone, tablet, computer, Internet of Things (IoT) receiver, and so on. The apparatus 600 may include one or more processors 602, one or more memories 604 and video processing circuitry 606. The processor(s) 602 may be configured to implement one or more methods described in the present document. The memory (memories) 604 may be used for storing data and code used for implementing the methods and techniques described herein. The video processing circuitry 606 may be used to implement, in hardware circuitry, some techniques described in the present document. In some embodiments, the video processing circuitry 606 may be at least partly included in the processor 602, e.g., a graphics co-processor.

Figure 7:
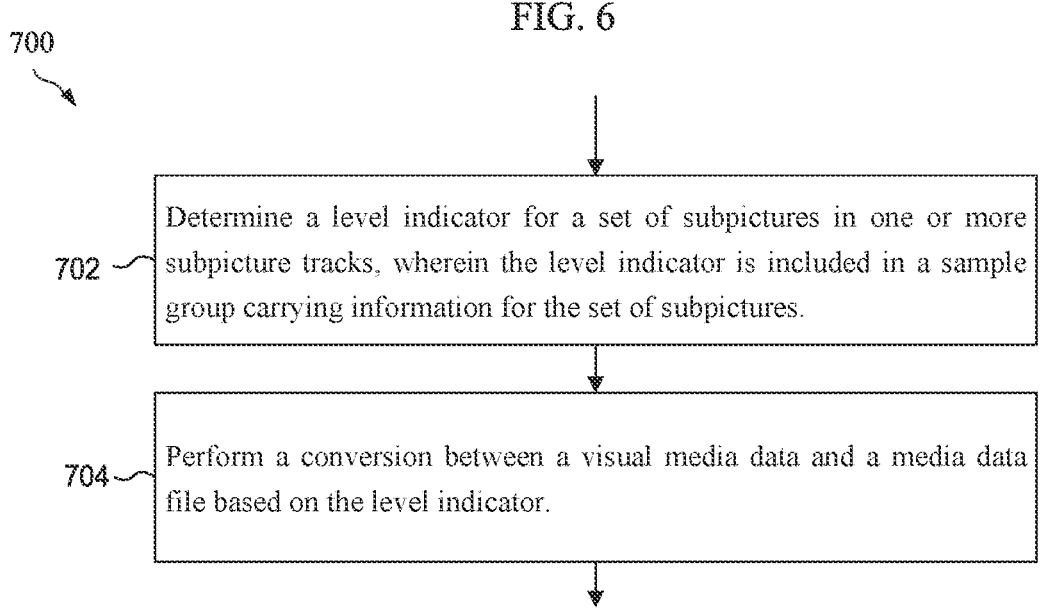
FIG. 7 is a flowchart for an example method of video processing.

FIG. 7 is a flowchart for an example method 700 of video processing. The method 700 includes determining a level indicator for a set of subpictures in one or more subpicture tracks at step 702. The level indicator is included in a sample group carrying information for the set of subpictures at step 702. In an example, the sample group may be indicated in a sample group entry, and the sample group may specify the set of subpictures in the subpicture tracks. In an example, a name of the sample group can be used to indicate the level indicator. For example, the sample group may be named a subpicture level information sample group, and the subpicture level information sample group name may act as a level indicator. In some examples, the level indicator is contained in a sample entry of the sample group.

Further, the subpicture tracks may be included in a subpicture entity group. The subpicture entity group may include one or more tracks and may be specified by an entity to group box. In an example, a sample entry of the sample group may contain an indication of a grouping type of the subpicture entity group. In another example, a grouping type parameter (grouping_type_parameter) of the sample group may contain an indication of a grouping type of the subpicture entity group. In some examples, a rule may require all sample to group boxes (SampleToGroupBoxes) for subpictures to contain a grouping_type_parameter indicating a grouping type of the subpicture entity group. In an example, one bit of the grouping_type_parameter is a subpicture common group flag (subpic_common_group_flag) that indicates the grouping type of the subpicture entity group. In an example, a group identifier of an entity to group box associated with the subpicture entity group can be contained in a sample entry of the sample group.

A conversion is performed between a visual media data and a media data file based on the level indicator at step 704. When the method 700 is performed on an encoder, the conversion comprises generating the media data file according to the visual media data. When the method 700 is performed on a decoder, the conversion comprises parsing and decoding the media data file to obtain the visual media data.

It should be noted that the method 700 can be implemented in an apparatus for processing video data comprising a processor and a non-transitory memory with instructions thereon, such as video encoder 900, video decoder 1000, and/or encoder 1100. In such a case, the instructions upon execution by the processor, cause the processor to perform the method 700. Further, the method 700 can be performed by a non-transitory computer readable medium comprising a computer program product for use by a video coding device. The computer program product comprises computer executable instructions stored on the non-transitory computer readable medium such that when executed by a processor cause the video coding device to perform the method 700.

Figure 8:
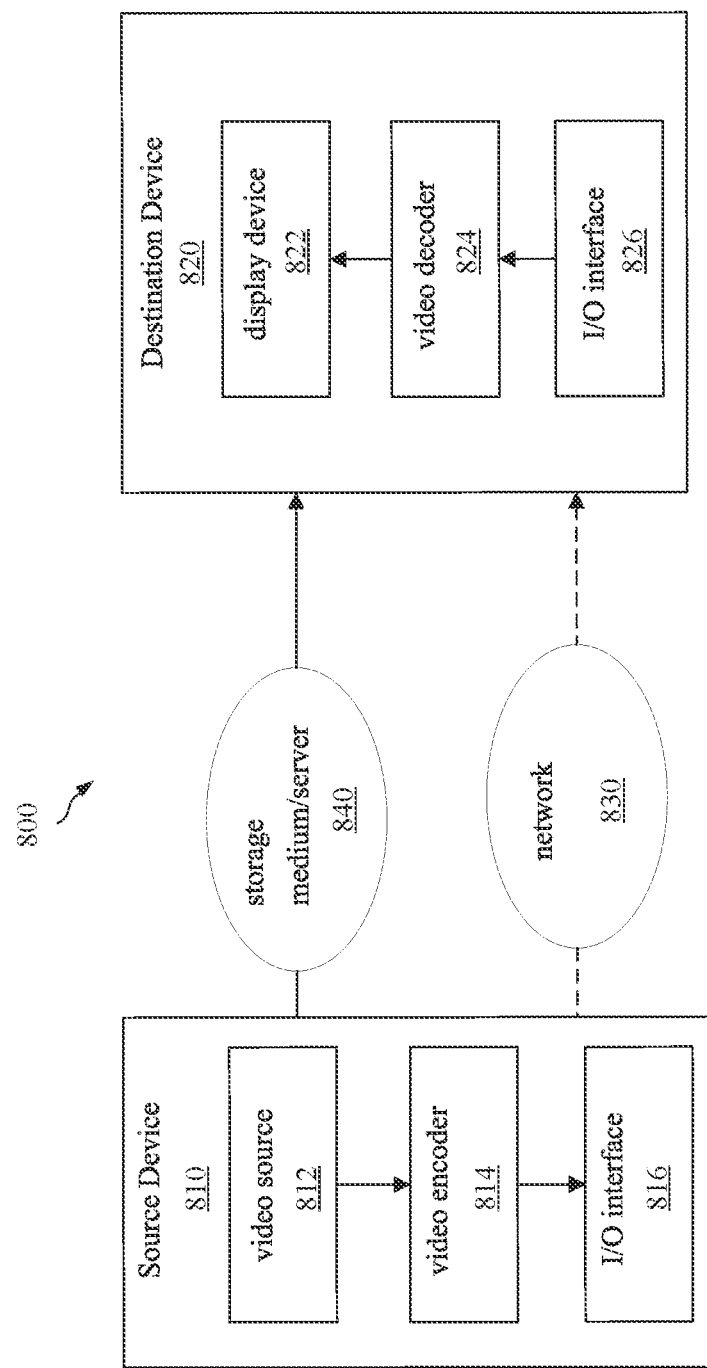
FIG. 8 is a block diagram that illustrates an example video coding system.

FIG. 8 is a block diagram that illustrates an example video coding system 800 that may utilize the techniques of this disclosure. As shown in FIG. 8, video coding system 800 may include a source device 810 and a destination device 820. Source device 810 generates encoded video data which may be referred to as a video encoding device. Destination device 820 may decode the encoded video data generated by source device 810 which may be referred to as a video decoding device.

Source device 810 may include a video source 812, a video encoder 814, and an input/output (I/O) interface 816. Video source 812 may include a source such as a video capture device, an interface to receive video data from a video content provider, and/or a computer graphics system for generating video data, or a combination of such sources. The video data may comprise one or more pictures. Video encoder 814 encodes the video data from video source 812 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 816 may include a modulator/demodulator (modem) and/or a transmitter. The encoded video data may be transmitted directly to destination device 820 via I/O interface 816 through network 830. The encoded video data may also be stored onto a storage medium/server 840 for access by destination device 820.

Destination device 820 may include an I/O interface 826, a video decoder 824, and a display device 822. I/O interface 826 may include a receiver and/or a modem. I/O interface 826 may acquire encoded video data from the source device 810 or the storage medium/server 840. Video decoder 824 may decode the encoded video data. Display device 822 may display the decoded video data to a user. Display device 822 may be integrated with the destination device 820, or may be external to destination device 820, which can be configured to interface with an external display device.

Video encoder 814 and video decoder 824 may operate according to a video compression standard, such as the High Efficiency Video Coding (HEVC) standard, Versatile Video Coding (VVM) standard and other current and/or further standards.

Figure 9:
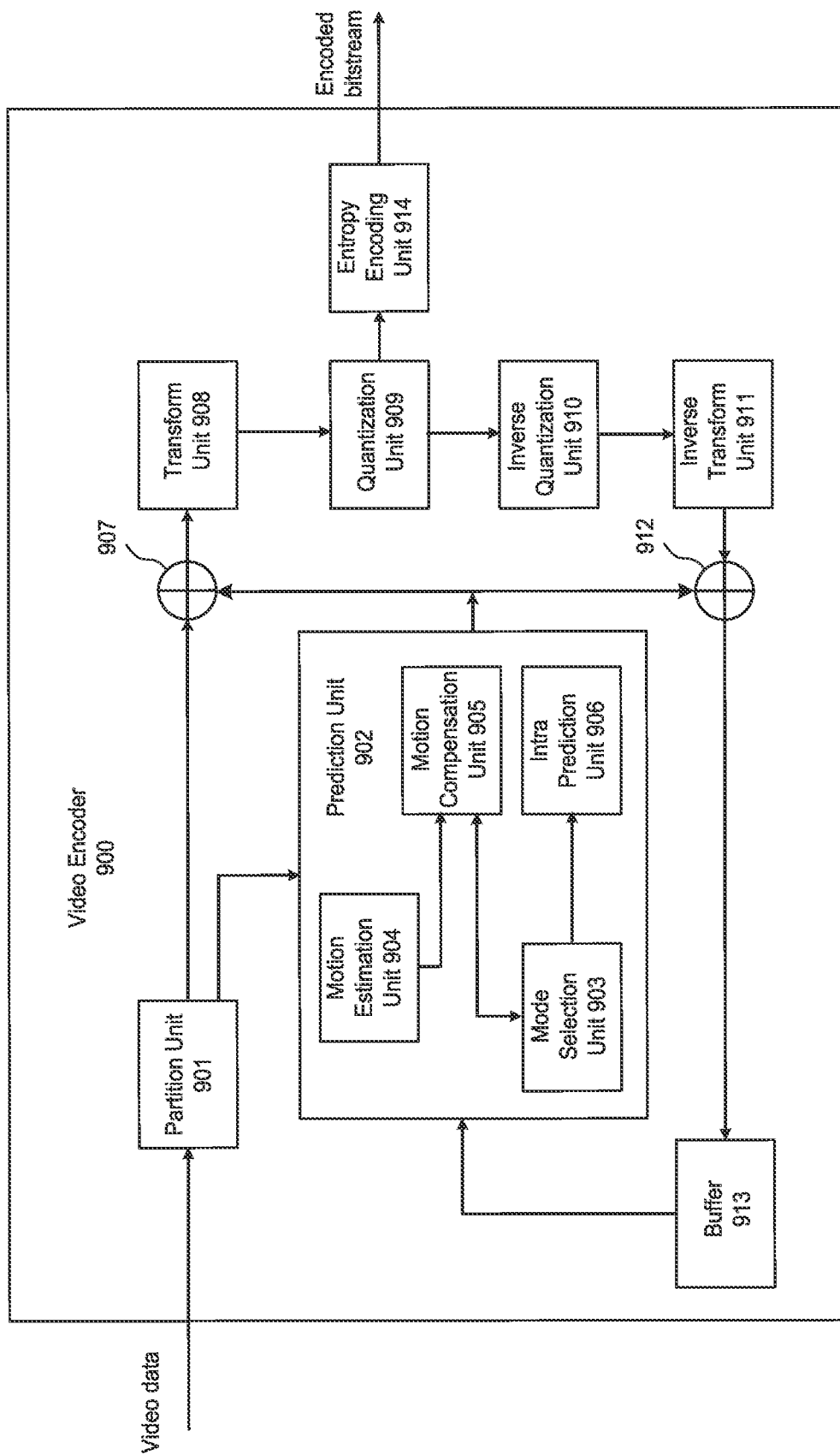
FIG. 9 is a block diagram that illustrates an example encoder.

FIG. 9 is a block diagram illustrating an example of video encoder 900, which may be video encoder 814 in the system 800 illustrated in FIG. 8. Video encoder 900 may be configured to perform any or all of the techniques of this disclosure. In the example of FIG. 9, video encoder 900 includes a plurality of functional components. The techniques described in this disclosure may be shared among the various components of video encoder 900. In some examples, a processor may be configured to perform any or all of the techniques described in this disclosure.

The functional components of video encoder 900 may include a partition unit 901, a prediction unit 902 which may include a mode select unit 903, a motion estimation unit 904, a motion compensation unit 905, an intra prediction unit 906, a residual generation unit 907, a transform processing unit 908, a quantization unit 909, an inverse quantization unit 910, an inverse transform unit 911, a reconstruction unit 912, a buffer 913, and an entropy encoding unit 914.

In other examples, video encoder 900 may include more, fewer, or different functional components. In an example, prediction unit 902 may include an intra block copy (IBC) unit. The IBC unit may perform prediction in an IBC mode in which at least one reference picture is a picture where the current video block is located.

Furthermore, some components, such as motion estimation unit 904 and motion compensation unit 905 may be highly integrated, but are represented in the example of FIG. 9 separately for purposes of explanation.

Partition unit 901 may partition a picture into one or more video blocks. Video encoder 900 and video decoder 1000 may support various video block sizes.

Mode select unit 903 may select one of the coding modes, intra or inter, e.g., based on error results, and provide the resulting intra or inter coded block to a residual generation unit 907 to generate residual block data and to a reconstruction unit 912 to reconstruct the encoded block for use as a reference picture. In some examples, mode select unit 903 may select a combination of intra and inter prediction (CIIP) mode in which the prediction is based on an inter prediction signal and an intra prediction signal. Mode select unit 903 may also select a resolution for a motion vector (e.g., a sub-pixel or integer pixel precision) for the block in the case of inter prediction.

To perform inter prediction on a current video block, motion estimation unit 904 may generate motion information for the current video block by comparing one or more reference frames from buffer 913 to the current video block. Motion compensation unit 905 may determine a predicted video block for the current video block based on the motion information and decoded samples of pictures from buffer 913 other than the picture associated with the current video block.

Motion estimation unit 904 and motion compensation unit 905 may perform different operations for a current video block, for example, depending on whether the current video block is in an I slice, a P slice, or a B slice.

In some examples, motion estimation unit 904 may perform uni-directional prediction for the current video block, and motion estimation unit 904 may search reference pictures of list 0 or list 1 for a reference video block for the current video block. Motion estimation unit 904 may then generate a reference index that indicates the reference picture in list 0 or list 1 that contains the reference video block and a motion vector that indicates a spatial displacement between the current video block and the reference video block. Motion estimation unit 904 may output the reference index, a prediction direction indicator, and the motion vector as the motion information of the current video block. Motion compensation unit 905 may generate the predicted video block of the current block based on the reference video block indicated by the motion information of the current video block.

In other examples, motion estimation unit 904 may perform bi-directional prediction for the current video block, motion estimation unit 904 may search the reference pictures in list 0 for a reference video block for the current video block and may also search the reference pictures in list 1 for another reference video block for the current video block. Motion estimation unit 904 may then generate reference indexes that indicate the reference pictures in list 0 and list 1 containing the reference video blocks and motion vectors that indicate spatial displacements between the reference video blocks and the current video block. Motion estimation unit 904 may output the reference indexes and the motion vectors of the current video block as the motion information of the current video block. Motion compensation unit 905 may generate the predicted video block of the current video block based on the reference video blocks indicated by the motion information of the current video block.

In some examples, motion estimation unit 904 may output a full set of motion information for decoding processing of a decoder. In some examples, motion estimation unit 904 may not output a full set of motion information for the current video. Rather, motion estimation unit 904 may signal the motion information of the current video block with reference to the motion information of another video block. For example, motion estimation unit 904 may determine that the motion information of the current video block is sufficiently similar to the motion information of a neighboring video block.

In one example, motion estimation unit 904 may indicate, in a syntax structure associated with the current video block, a value that indicates to the video decoder 1000 that the current video block has the same motion information as another video block.

In another example, motion estimation unit 904 may identify, in a syntax structure associated with the current video block, another video block and a motion vector difference (MVD). The motion vector difference indicates a difference between the motion vector of the current video block and the motion vector of the indicated video block. The video decoder 1000 may use the motion vector of the indicated video block and the motion vector difference to determine the motion vector of the current video block.

As discussed above, video encoder 900 may predictively signal the motion vector. Two examples of predictive signaling techniques that may be implemented by video encoder 900 include advanced motion vector prediction (AMVP) and merge mode signaling.

Intra prediction unit 906 may perform intra prediction on the current video block. When intra prediction unit 906 performs intra prediction on the current video block, intra prediction unit 906 may generate prediction data for the current video block based on decoded samples of other video blocks in the same picture. The prediction data for the current video block may include a predicted video block and various syntax elements.

Residual generation unit 907 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 907 may not perform the subtracting operation.

Transform processing unit 908 may generate one or more transform coefficient video blocks for the current video block by applying one or more transforms to a residual video block associated with the current video block.

After transform processing unit 908 generates a transform coefficient video block associated with the current video block, quantization unit 909 may quantize the transform coefficient video block associated with the current video block based on one or more quantization parameter (QP) values associated with the current video block.

Inverse quantization unit 910 and inverse transform unit 911 may apply inverse quantization and inverse transforms to the transform coefficient video block, respectively, to reconstruct a residual video block from the transform coefficient video block. Reconstruction unit 912 may add the reconstructed residual video block to corresponding samples from one or more predicted video blocks generated by the prediction unit 902 to produce a reconstructed video block associated with the current block for storage in the buffer 913.

After reconstruction unit 912 reconstructs the video block, the loop filtering operation may be performed to reduce video blocking artifacts in the video block.

Entropy encoding unit 914 may receive data from other functional components of the video encoder 900. When entropy encoding unit 914 receives the data, entropy encoding unit 914 may perform one or more entropy encoding operations to generate entropy encoded data and output a bitstream that includes the entropy encoded data.

Figure 10:
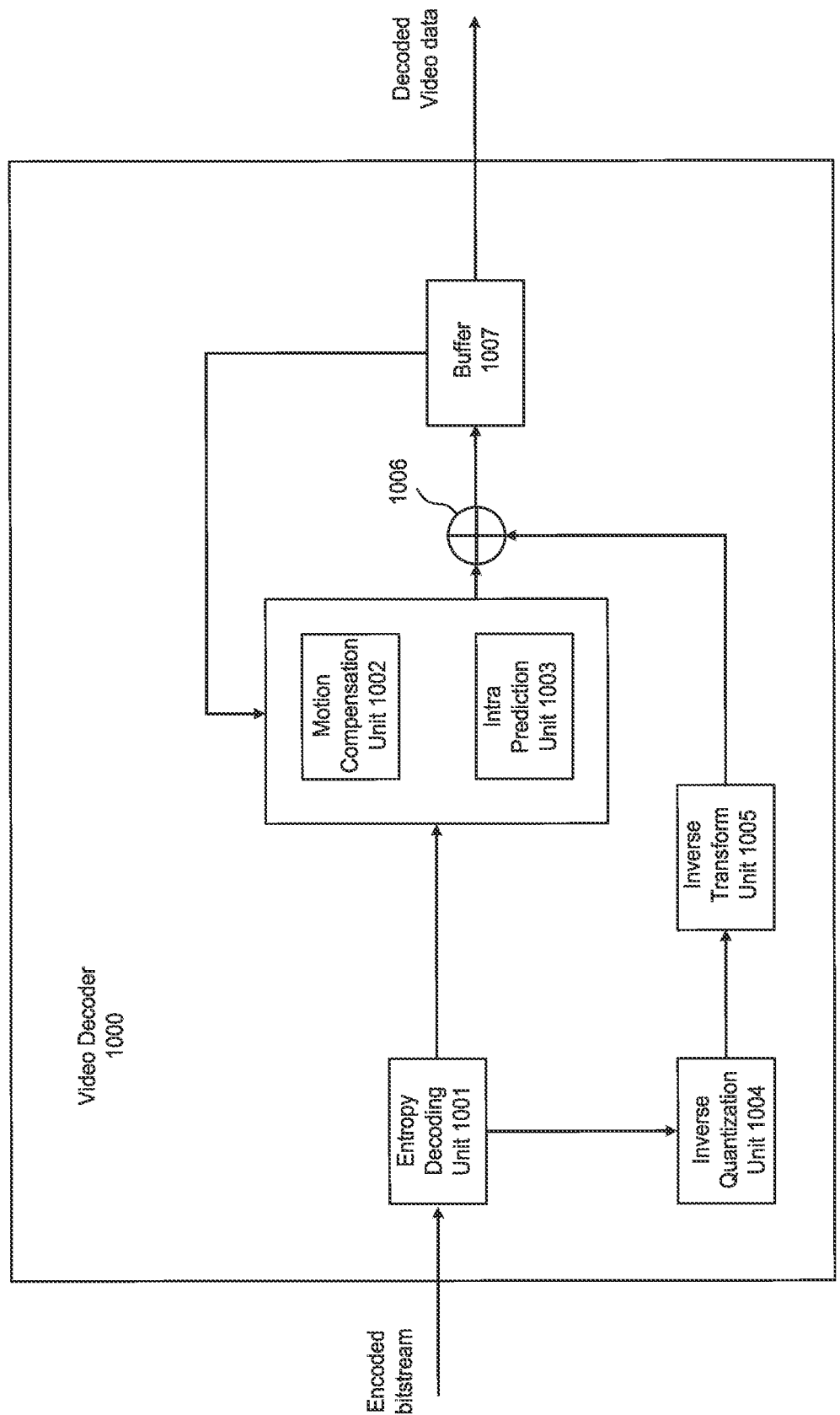
FIG. 10 is a block diagram that illustrates an example decoder.

FIG. 10 is a block diagram illustrating an example of video decoder 1000 which may be video decoder 824 in the system 800 illustrated in FIG. 8. The video decoder 1000 may be configured to perform any or all of the techniques of this disclosure. In the example of FIG. 10, the video decoder 1000 includes a plurality of functional components. The techniques described in this disclosure may be shared among the various components of the video decoder 1000. In some examples, a processor may be configured to perform any or all of the techniques described in this disclosure.

In the example of FIG. 10, video decoder 1000 includes an entropy decoding unit 1001, a motion compensation unit 1002, an intra prediction unit 1003, an inverse quantization unit 1004, an inverse transformation unit 1005, and a reconstruction unit 1006 and a buffer 1007. Video decoder 1000 may, in some examples, perform a decoding pass generally reciprocal to the encoding pass described with respect to video encoder 900 (FIG. 9).

Entropy decoding unit 1001 may retrieve an encoded bitstream. The encoded bitstream may include entropy coded video data (e.g., encoded blocks of video data). Entropy decoding unit 1001 may decode the entropy coded video data, and from the entropy decoded video data, motion compensation unit 1002 may determine motion information including motion vectors, motion vector precision, reference picture list indexes, and other motion information. Motion compensation unit 1002 may, for example, determine such information by performing the AMVP and merge mode.

Motion compensation unit 1002 may produce motion compensated blocks, possibly performing interpolation based on interpolation filters. Identifiers for interpolation filters to be used with sub-pixel precision may be included in the syntax elements.

Motion compensation unit 1002 may use interpolation filters as used by video encoder 900 during encoding of the video block to calculate interpolated values for sub-integer pixels of a reference block. Motion compensation unit 1002 may determine the interpolation filters used by video encoder 900 according to received syntax information and use the interpolation filters to produce predictive blocks.

Motion compensation unit 1002 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 1003 may use intra prediction modes for example received in the bitstream to form a prediction block from spatially adjacent blocks. Inverse quantization unit 1004 inverse quantizes, i.e., de-quantizes, the quantized video block coefficients provided in the bitstream and decoded by entropy decoding unit 1001. Inverse transform unit 1005 applies an inverse transform.

Reconstruction unit 1006 may sum the residual blocks with the corresponding prediction blocks generated by motion compensation unit 1002 or intra prediction unit 1003 to form decoded blocks. If desired, a deblocking filter may also be applied to filter the decoded blocks in order to remove blockiness artifacts. The decoded video blocks are then stored in buffer 1007, which provides reference blocks for subsequent motion compensation/intra prediction and also produces decoded video for presentation on a display device.

Figure 11:
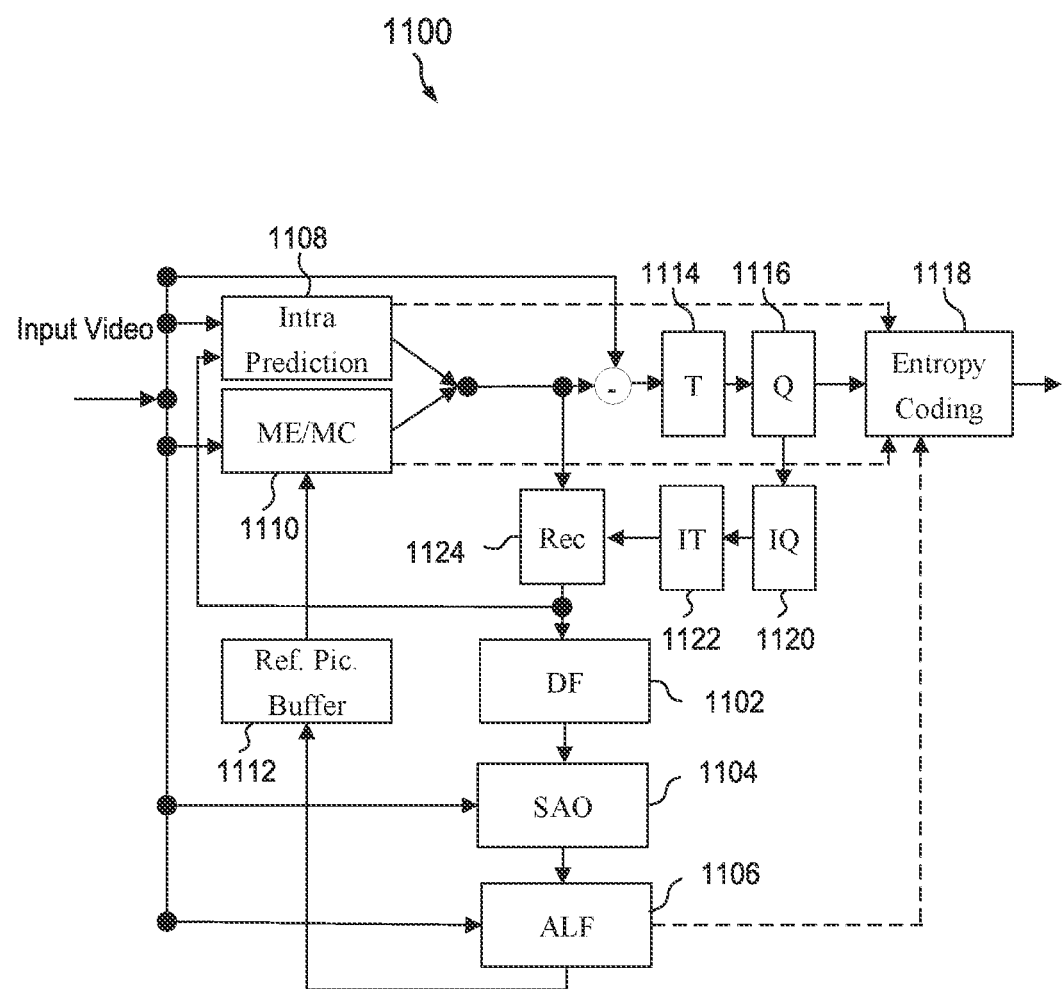
FIG. 11 is a schematic diagram of an example encoder.

FIG. 11 is a schematic diagram of an example encoder 1100. The encoder 1100 is suitable for implementing the techniques of VVC. The encoder 1100 includes three in-loop filters, namely a deblocking filter (DF) 1102, a sample adaptive offset (SAO) 1104, and an adaptive loop filter (ALF) 1106. Unlike the DF 1102, which uses predefined filters, the SAO 1104 and the ALF 1106 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 1106 is located at the last processing stage of each picture and can be regarded as a tool trying to catch and fix artifacts created by the previous stages.

The encoder 1100 further includes an intra prediction component 1108 and a motion estimation/compensation (ME/MC) component 1110 configured to receive input video. The intra prediction component 1108 is configured to perform intra prediction, while the ME/MC component 1110 is configured to utilize reference pictures obtained from a reference picture buffer 1112 to perform inter prediction. Residual blocks from inter prediction or intra prediction are fed into a transform (T) component 1114 and a quantization (Q) component 1116 to generate quantized residual transform coefficients, which are fed into an entropy coding component 1118. The entropy coding component 1118 entropy codes the prediction results and the quantized transform coefficients and transmits the same toward a video decoder (not shown). Quantization components output from the quantization component 1116 may be fed into an inverse quantization (IQ) components 1120, an inverse transform component 1122, and a reconstruction (REC) component 1124. The REC component 1124 is able to output images to the DF 1102, the SAO 1104, and the ALF 1106 for filtering prior to those images being stored in the reference picture buffer 1112.

A listing of solutions preferred by some examples is provided next.

The following solutions show examples of techniques discussed herein.

1. A visual media processing method (e.g., method 700 depicted in FIG. 7), comprising: performing a conversion between a visual media information and a digital representation of the visual media information according to a rule, wherein the digital representation includes a number of sets of subpicture tracks that are logically grouped into one or more subpicture entity groups, and wherein the rule specifies that information related to the sets is included in one or more sample groups in the digital representation.

2. The method of solution 1, wherein the information includes a level indicator that indicates a coding level of each of the subpicture in the set.

3. The method of any of solutions 1-2, wherein the information related to the set is included in group box entry.

4. The method of any of solutions 1-2, wherein the information related to the set is included in a sample group entry.

5. The method of any of solutions 1-4, wherein the rule specifies that a track identifier of a track that contains the one or more sample groups is included in an entity to group box of the one or more subpicture entity groups.

6. The method of solution 5, wherein the track identifier is included in a level information track identifier (level_info_track_id) field.

7. The method of any of solutions 1-6, wherein the one or more sample groups comprise a single sample group, wherein the single sample group is dedicated to indicate a subpicture level information.

8. The method of solution 7, wherein the information is a single bit flag.

9. A method of media data processing, comprising: obtaining a digital representation of the visual media information, wherein the digital representation is generated according to a method described in any of solutions 1-8; and streaming the digital representation.

10. A method of media data processing, comprising: receiving a digital representation of the visual media information, wherein the digital representation is generated according to a method described in any of solutions 1-8; and generating the visual media information from the digital representation.

11. The method of any of solutions 1-10, wherein the conversion comprises generating a bitstream representation of the visual media data and storing the bitstream representation to the file according to the format rule.

12. The method of any of solutions 1-10, wherein the conversion comprises parsing the file according to the format rule to recover the visual media data.

13. A video decoding apparatus comprising a processor configured to implement a method recited in one or more of solutions 1 to 12.

14. A video encoding apparatus comprising a processor configured to implement a method recited in one or more of solutions 1 to 12.

15. A computer program product having computer code stored thereon, the code, when executed by a processor, causes the processor to implement a method recited in any of solutions 1 to 12.

16. A computer readable medium on which a bitstream representation complying to a file format that is generated according to any of solutions 1 to 12.

17. A method, apparatus or system described in the present document.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing video data comprising:
determining a level indicator for a set of subpictures in one or more subpicture tracks, wherein the level indicator is included in a sample group carrying information for the set of subpictures, and wherein the level indicator is contained in a sample entry of the sample group; and
performing a conversion between a visual media data and a media data file based on the level indicator.

2. The method of claim 1, wherein a name of the sample group that includes 'spli' indicates the level indicator is included in the sample group.

3. The method of claim 2, wherein the sample group is a subpicture level information sample group.

4. The method of claim 1, wherein the subpicture tracks are included in a subpicture entity group.

5. The method of claim 4, wherein the sample entry of the sample group contains an indication of a grouping type of the subpicture entity group.

6. The method of claim 4, wherein a grouping type parameter (grouping_type_parameter) of the sample group contains an indication of a grouping type of the subpicture entity group.

7. The method of claim 4, wherein a rule requires all sample to group boxes (SampleToGroupBoxes) for subpictures to contain a grouping type parameter (grouping_type_parameter) indicating a grouping type of the subpicture entity group.

8. The method of claim 7, wherein one bit of the grouping_type_parameter is a subpicture common group flag (subpic_common_group_flag) that indicates the grouping type of the subpicture entity group.

9. The method of claim 4, wherein a group identifier of an entity to group box (EntityToGroupBox) associated with the subpicture entity group is further contained in the sample entry of the sample group.

10. An apparatus for processing video data comprising:
a processor; and
a non-transitory memory with instructions thereon, wherein the instructions upon execution by the processor, cause the processor to:
determine a level indicator for a set of subpictures in one or more subpicture tracks, wherein the level indicator is included in a sample group carrying information for the set of subpictures, and wherein the level indicator is contained in a sample entry of the sample group; and
perform a conversion between a visual media data and a media data file based on the level indicator.

11. The apparatus of claim 10, wherein a name of the sample group that includes 'spli' indicates the level indicator is included in the sample group.

12. The apparatus of claim 11, wherein the sample group is a subpicture level information sample group.

13. The apparatus of claim 10, wherein the subpicture tracks are included in a subpicture entity group.

14. A non-transitory computer readable medium comprising a computer program product for use by a video coding device, the computer program product comprising computer executable instructions stored on the non-transitory computer readable medium such that when executed by a processor cause the video coding device to:
determine a level indicator for a set of subpictures in one or more subpicture tracks, wherein the level indicator is included in a sample group carrying information for the set of subpictures, and wherein the level indicator is contained in a sample entry of the sample group; and
perform a conversion between a visual media data and a media data file based on the level indicator.

15. The non-transitory computer readable medium of claim 14, wherein a name of the sample group that includes 'spli' indicates the level indicator is included in the sample group.

16. The non-transitory computer readable medium of claim 15, wherein the sample group is a subpicture level information sample group.

17. The non-transitory computer readable medium of claim 14, wherein the subpicture tracks are included in a subpicture entity group.

18. The method of claim 1, wherein the conversion includes encoding the visual media data into the media data file.

19. The method of claim 1, wherein the conversion includes decoding the visual media data from the media data file.

* * * * *